United States Patent
Shiomi et al.

[11] Patent Number: 5,677,841
[45] Date of Patent: Oct. 14, 1997

[54] CONTROL TARGET SURVEILLANCE SYSTEM

[75] Inventors: Kakuichi Shiomi, Tokyo; Suketoshi Nagano; Masataka Oka, both of Yokohama, all of Japan

[73] Assignees: Kabushiki Kaisha Toshiba, Kawasaki; Director-General, Ship Research Institute, Ministry of Transport, Tokyo, both of Japan

[21] Appl. No.: 401,270

[22] Filed: Mar. 9, 1995

[30] Foreign Application Priority Data

| Mar. 11, 1994 | [JP] | Japan | 6-041042 |
| Mar. 11, 1994 | [JP] | Japan | 6-041043 |
| Mar. 11, 1994 | [JP] | Japan | 6-041044 |
| Oct. 18, 1994 | [JP] | Japan | 6-252136 |
| Feb. 23, 1995 | [JP] | Japan | 7-035534 |

[51] Int. Cl.⁶ ............................................ G06F 163/00
[52] U.S. Cl. ..................... 364/439; 364/436; 364/449.7; 364/461
[58] Field of Search ............................. 364/461, 439, 364/436, 443, 460, 449.1, 449.7

[56] References Cited

U.S. PATENT DOCUMENTS

| 3,774,215 | 11/1973 | Reed | 364/449 |
| 3,793,635 | 2/1974 | Potter | 364/449 |
| 3,868,497 | 2/1975 | Vietor | 364/449 |
| 4,814,711 | 3/1989 | Olsen et al. | 364/449 |
| 4,845,629 | 7/1989 | Murga | 364/449 |
| 5,119,504 | 6/1992 | Durboraw, III | 364/449 |
| 5,367,524 | 11/1994 | Rideout, Jr. et al. | 370/104.1 |
| 5,412,389 | 5/1995 | Olds | 364/449 |
| 5,430,656 | 7/1995 | Dekel et al. | 364/449 |
| 5,450,329 | 9/1995 | Tanner | 364/449 |
| 5,574,648 | 11/1996 | Pilley | 364/439 |

FOREIGN PATENT DOCUMENTS

| 0 444 738 | 9/1991 | European Pat. Off. . |
| 0 559 074 | 9/1993 | European Pat. Off. . |
| 0 574 009 | 12/1993 | European Pat. Off. . |
| WO 93/01576 | 1/1993 | WIPO . |

*Primary Examiner*—Vincent N. Trans
*Attorney, Agent, or Firm*—Oblon, Spivak, McClelland, Maier & Neustadt, P.C.

[57] ABSTRACT

A control target surveillance system capable of acquiring positional data of a control target in a control zone at high precision with fewer communications lines in a short period of time. A D. GPS ground station obtains differential data with respect to positional data based on a GPS signal from a GPS satellite, and sends this data to a control target to compensate the positional data obtained from the GPS signal. A surveillance cycle is time-divided by the number of SSR codes, individual time slots are associated with the SSR codes, and each control target is allowed.

32 Claims, 27 Drawing Sheets

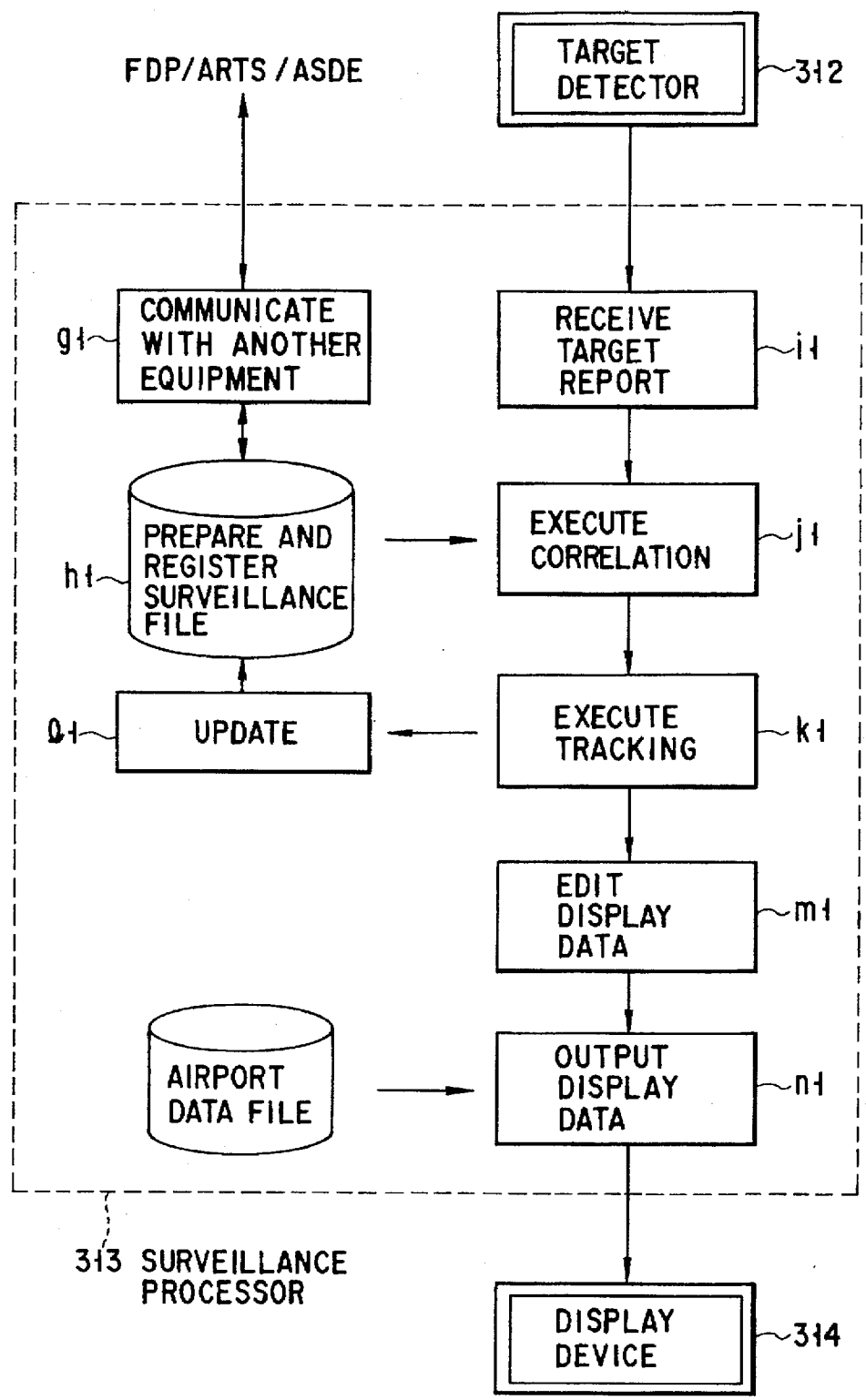
F I G. 3

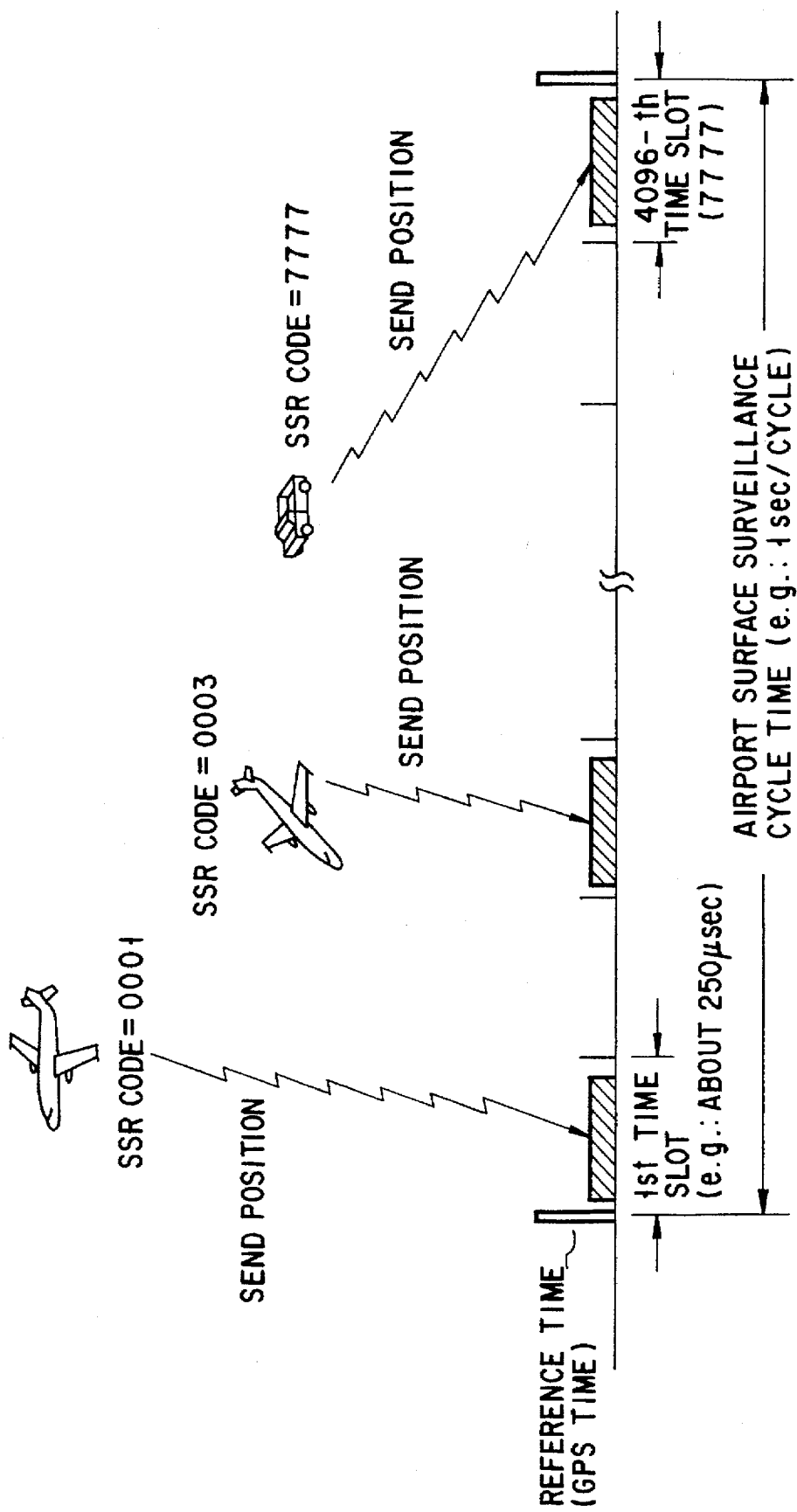
F I G. 4

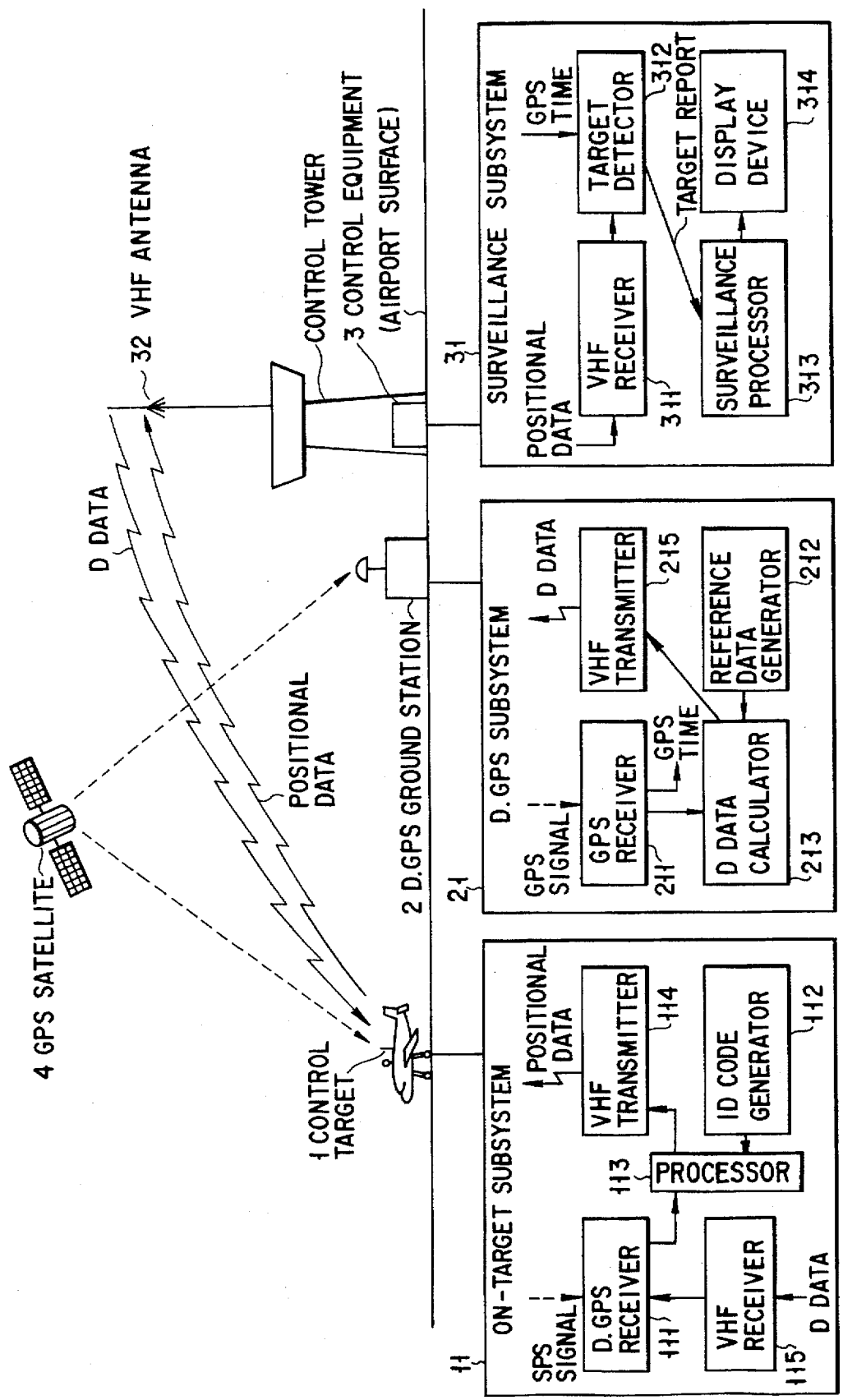
F I G. 5

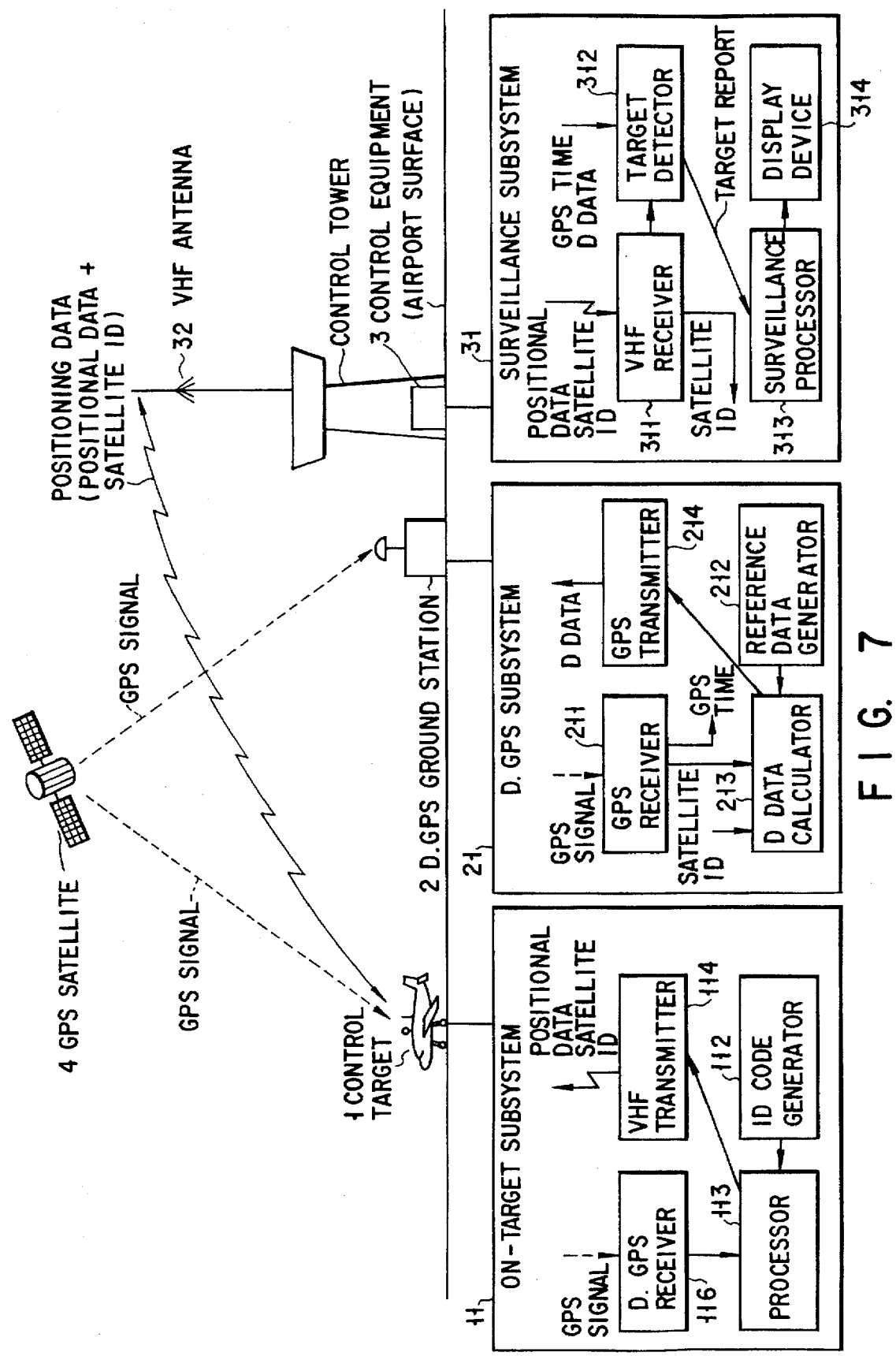
F I G. 7

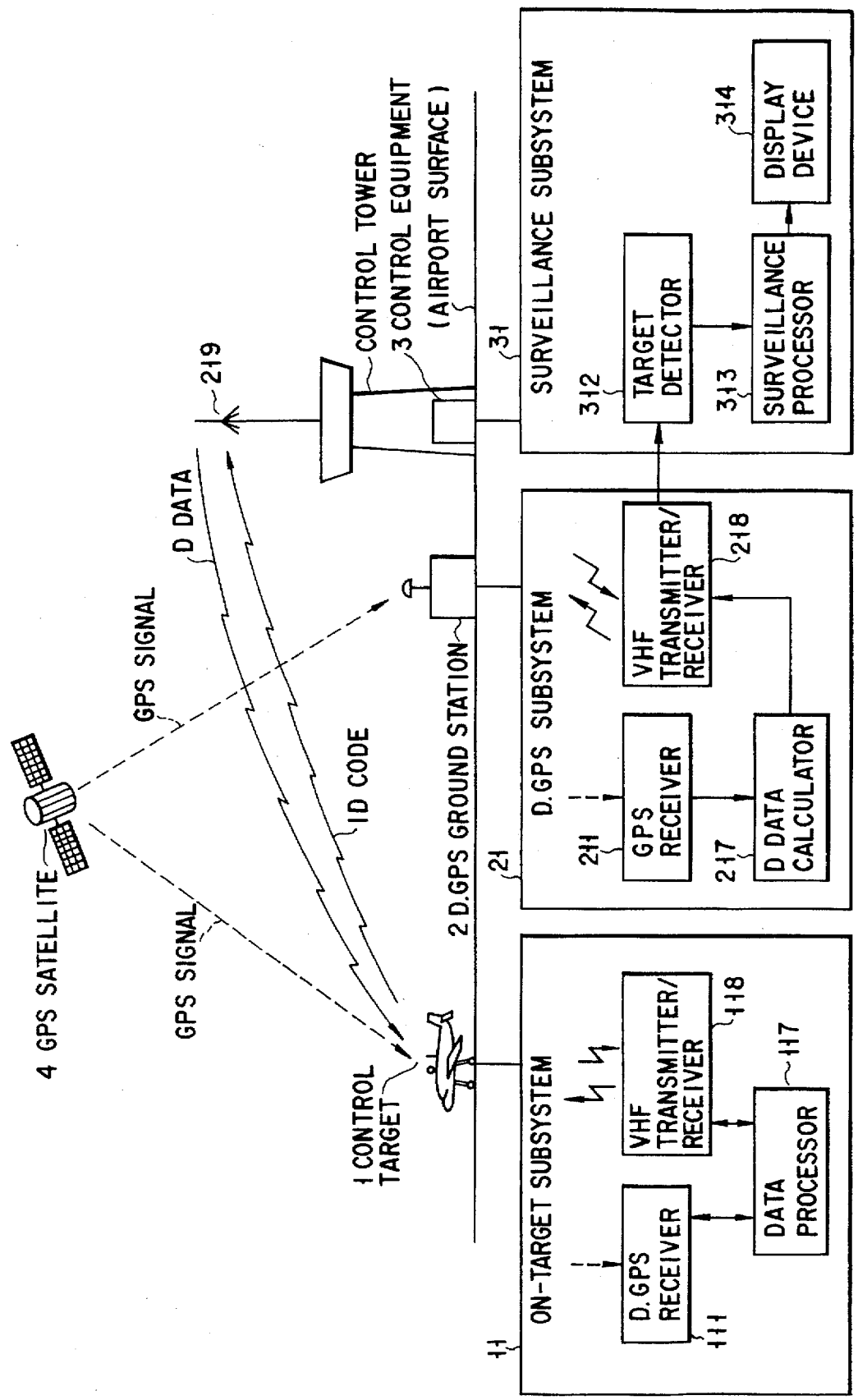
F I G. 8

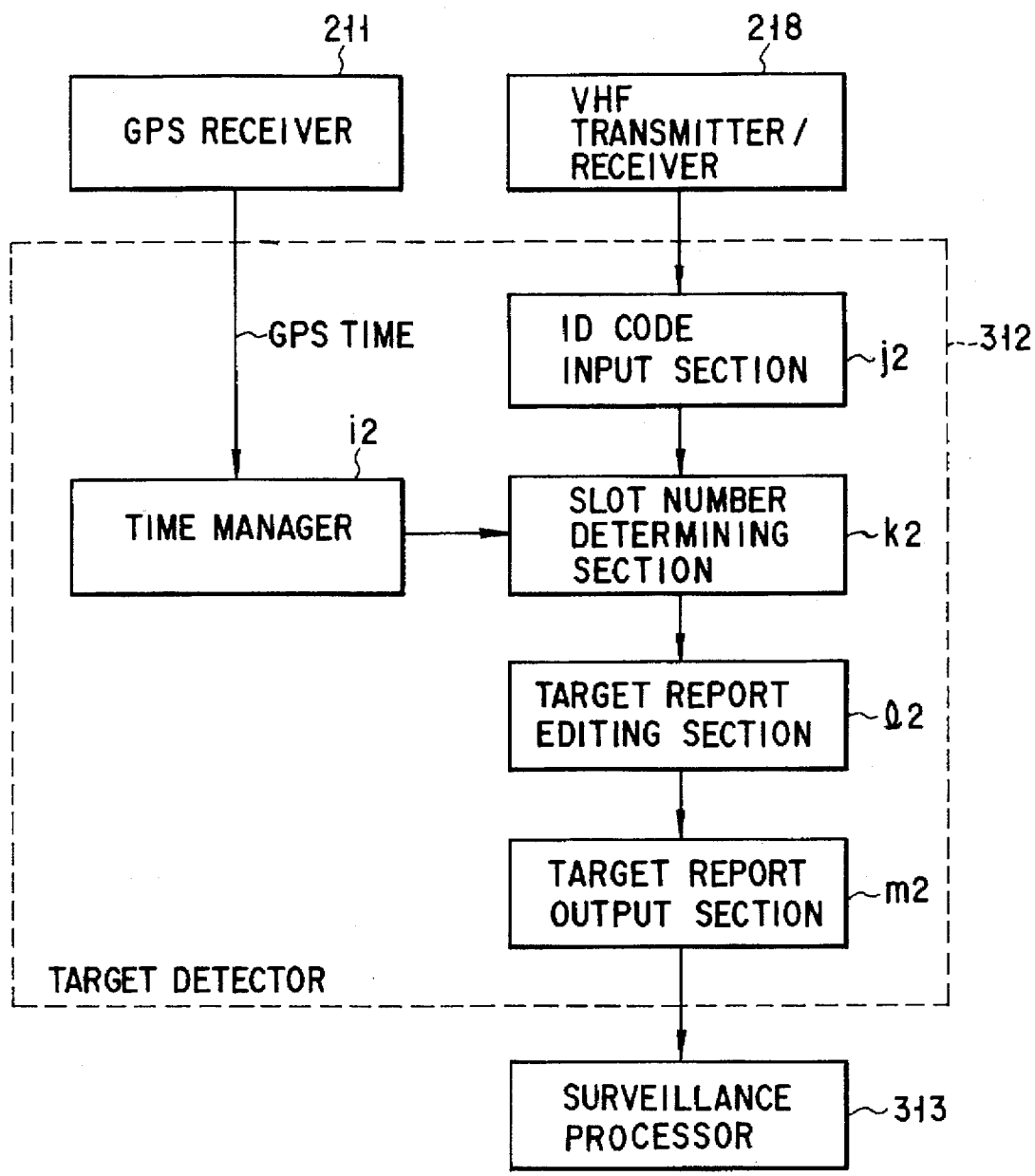
F I G. 10

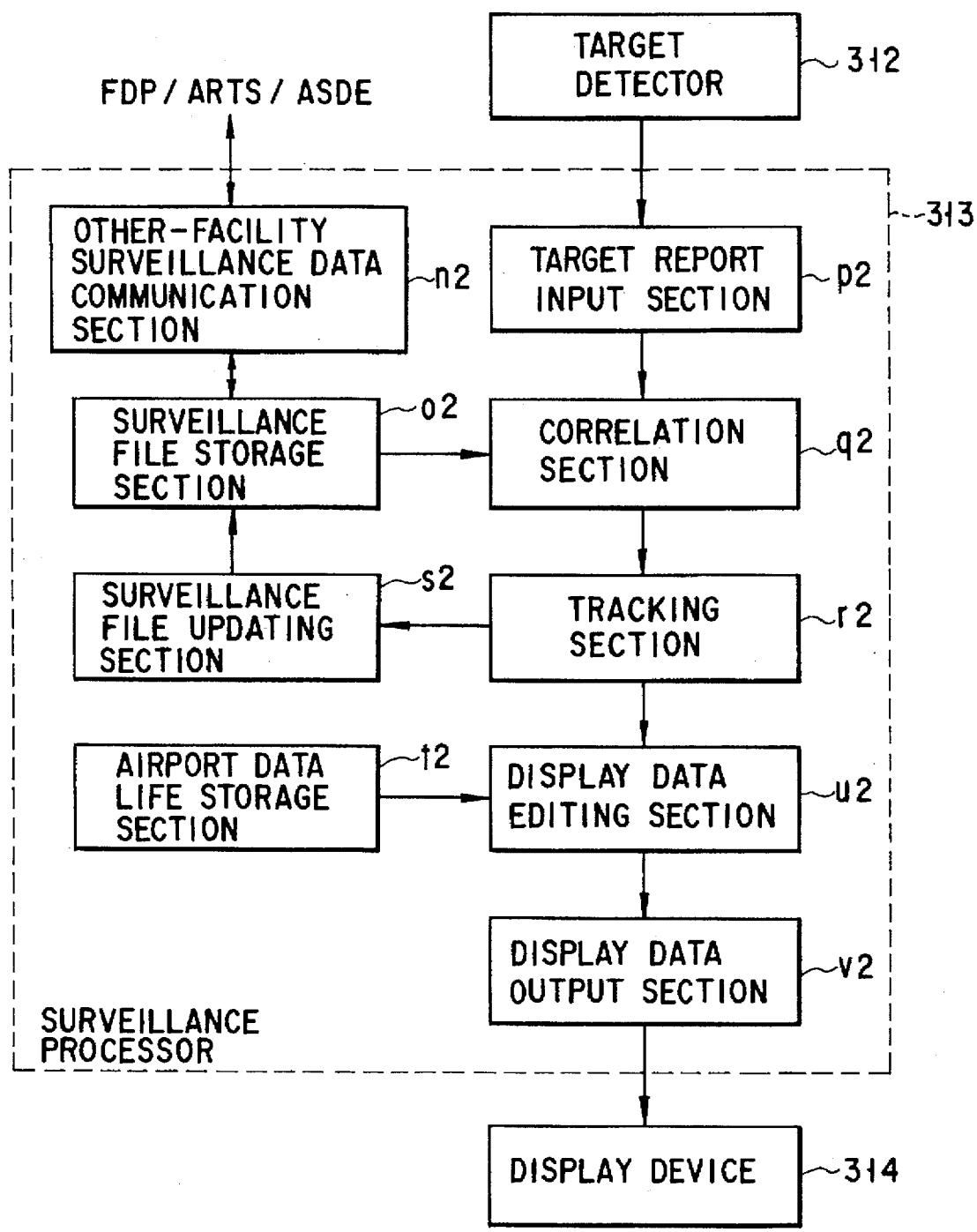
F I G. 11

| NO. | AIRPORT SURFACE POSITION | TRANSMISSION SLOT NO. | | TRANSMISSION ID CODE |
|---|---|---|---|---|
| | | 1st TRANSMISSION | 2nd TRANSMISSION | |
| (1) | Pos (3,2) | 3 | 2 | 1111 |
| (2) | Pos (7,4) | 7 | 4 | 2222 |
| (3) | Pos (10,3) | 10 | 3 | 3333 |
| | | | | |
| | | | | |
| | | | | |
FIG. 14
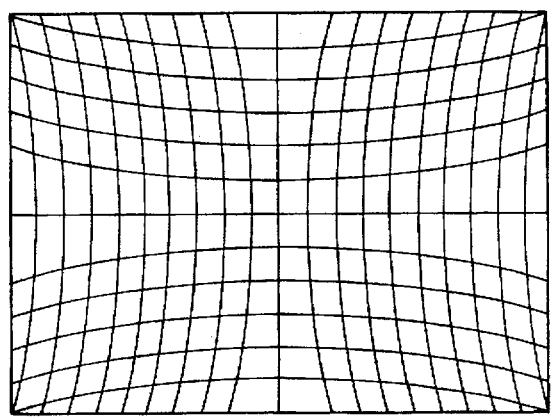
FIG. 15A
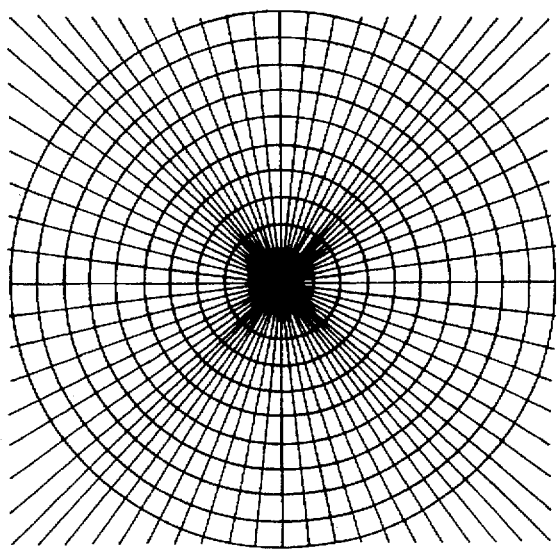
FIG. 15B

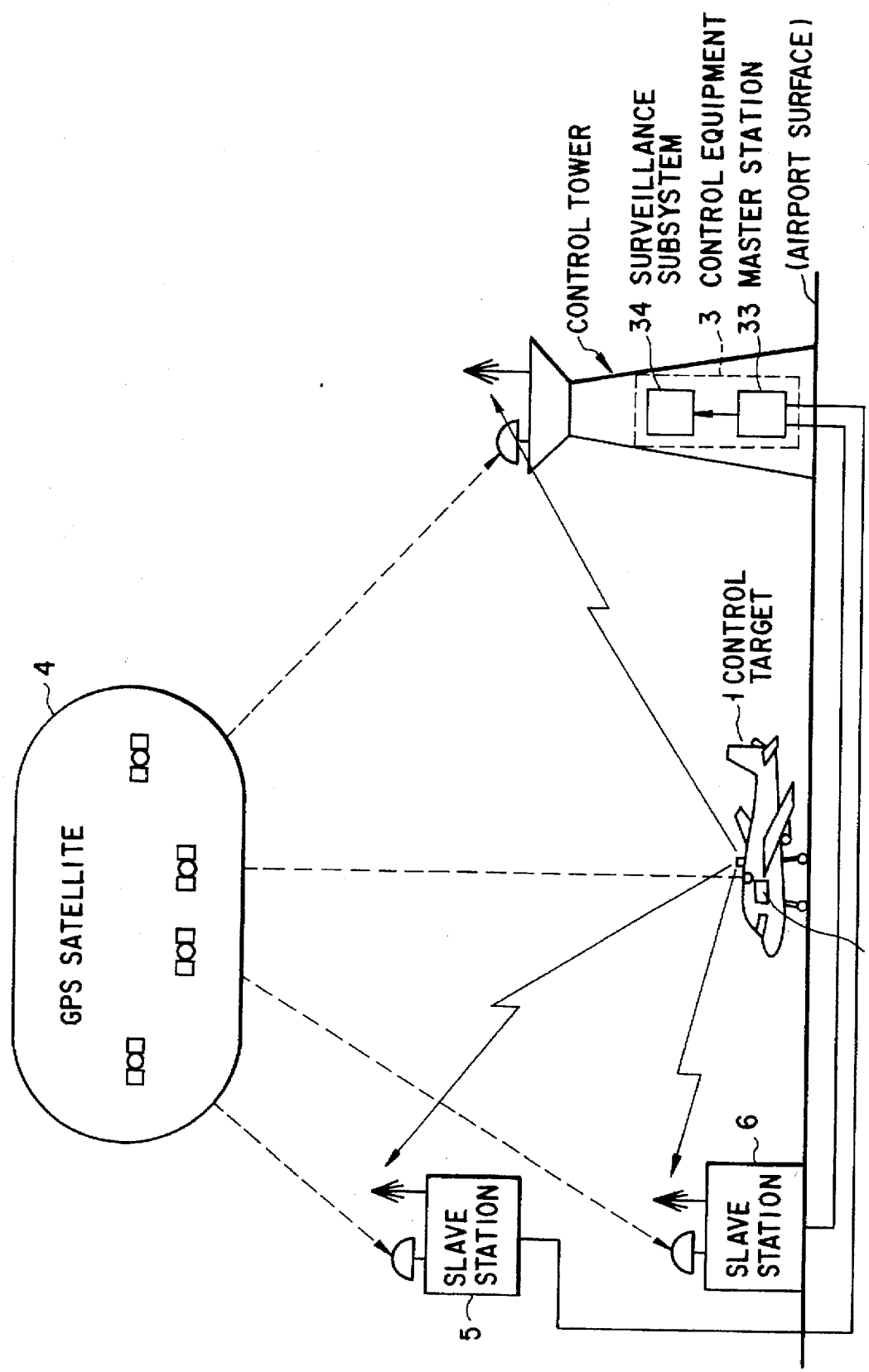
F I G. 16

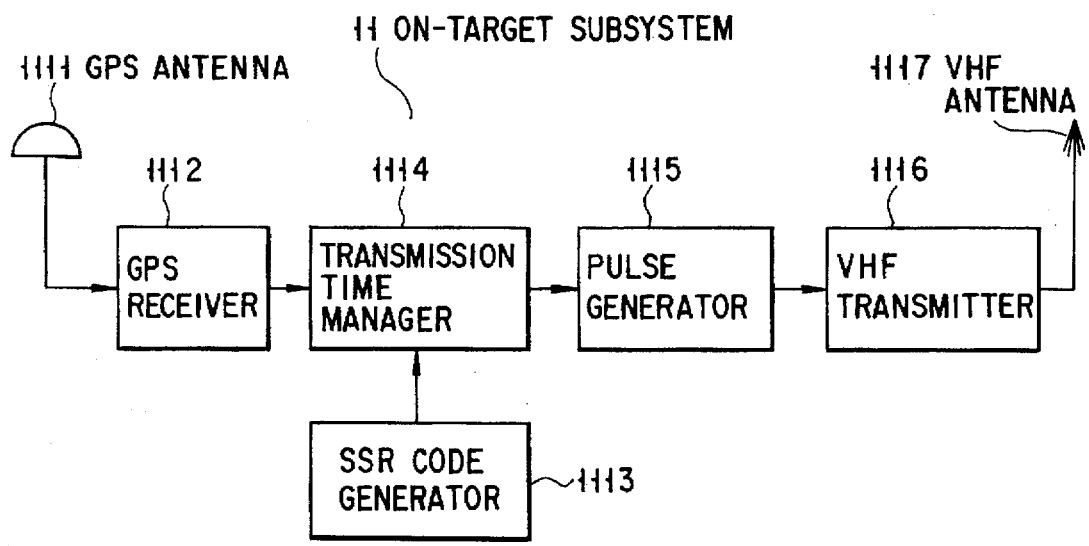
F I G. 17
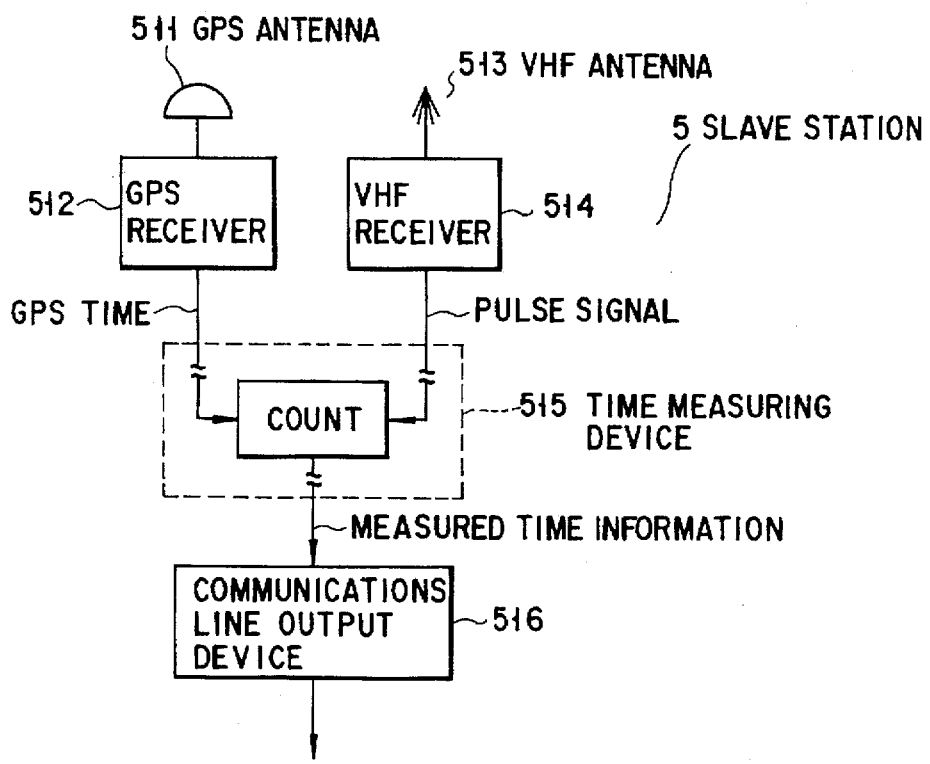
F I G. 18

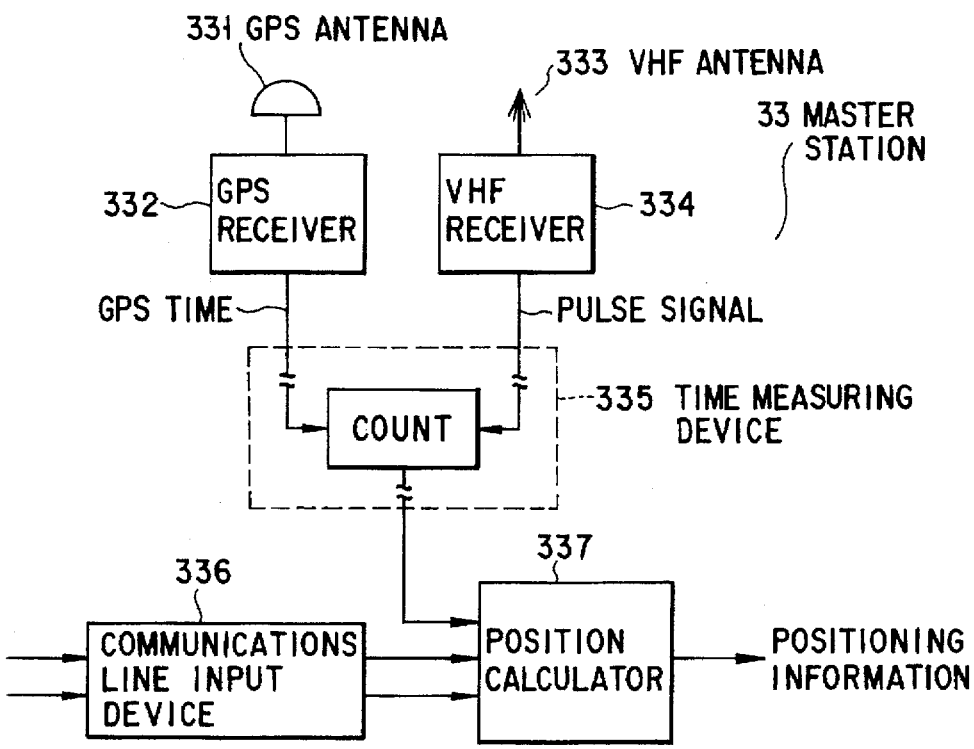
F I G. 19
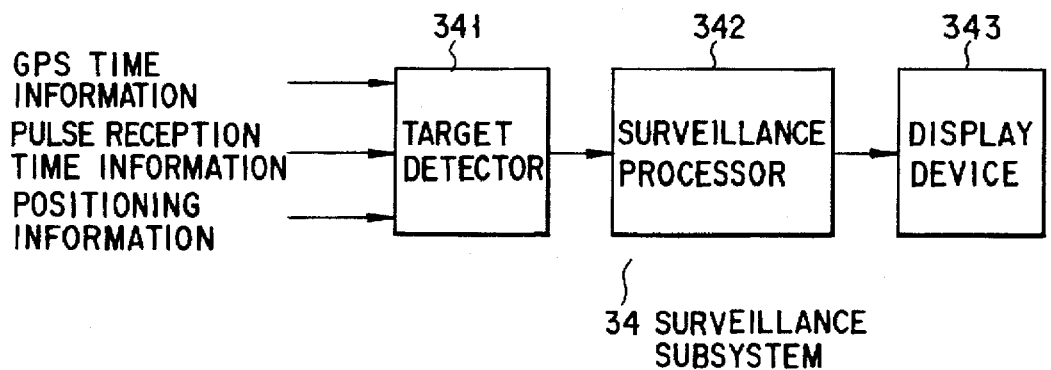
F I G. 20

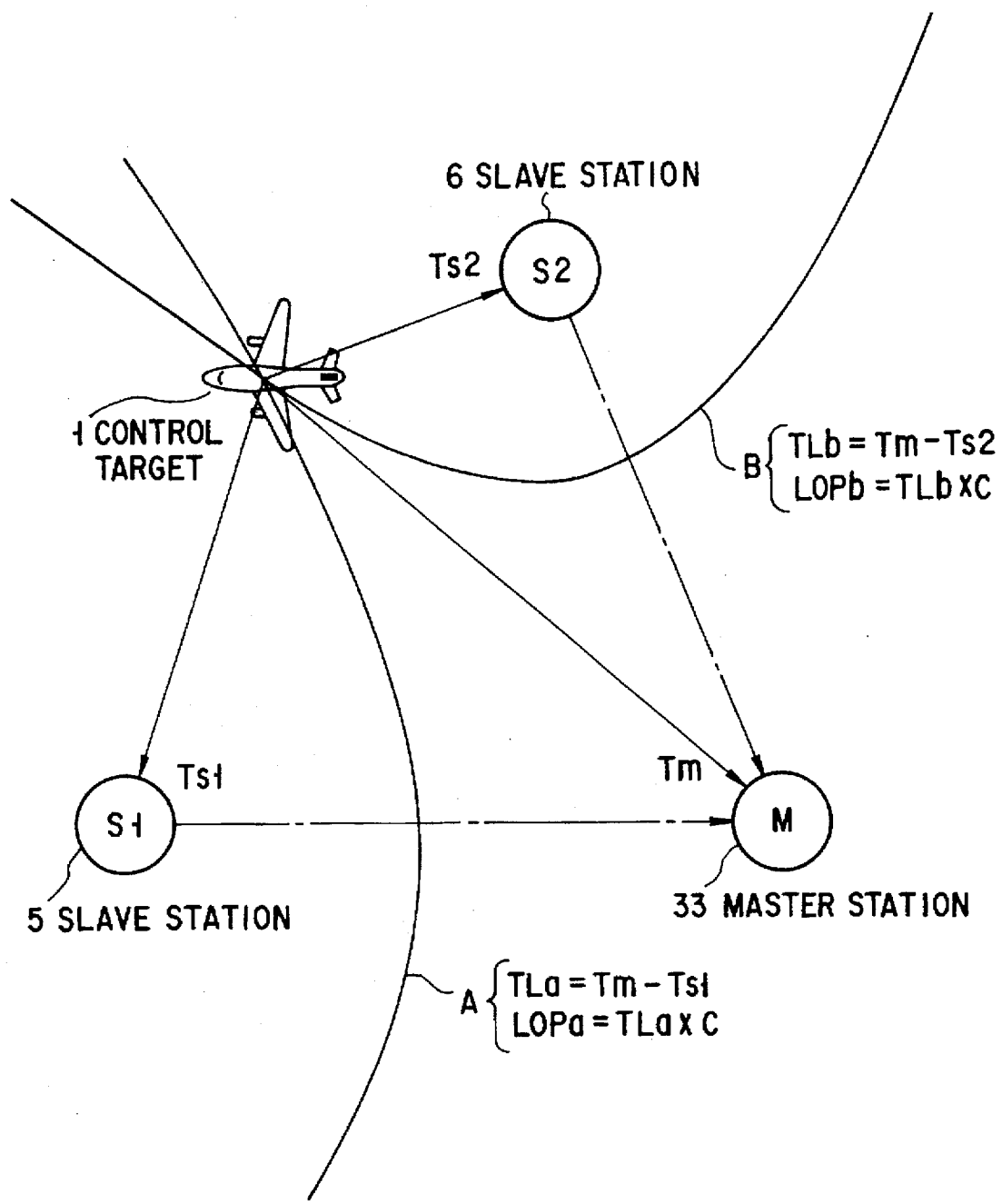
F I G. 24

CONTROL TARGET SURVEILLANCE SYSTEM

BACKGROUND OF THE INVENTION

1. Field of the Invention

The present invention relates to a control target surveillance system for monitoring the positions of control targets, such as airplanes and vehicles located in an airport surface.

The present invention relates also to a control target surveillance system for monitoring the position of a control target, such as an airplane flying over an ocean or a search and rescue aircraft flying between mountains.

2. Description of the Related Art

At the existing airports, a controller in a control tower monitors the positions of airplanes and vehicles by confirming the displayed contents of an airport surveillance radar (primary radar) and directly viewing the control targets. Such a surveillance system cannot however monitor a control target, such as an airplane located behind a building or a vehicle behind an airplane, and needs to face the safety problem particularly at the airports which suffer heavy traffic.

One conventional solution to this problem is to install TV cameras in the dead space or zone from the primary radar or the control tower. This scheme can cope with the problem only partially, and is affected by the weather conditions, so that the surveillance information has a low reliability. Apparently, this method cannot be said to be a fail-safe measure. Further, the primary radar has poor precision (effective in a range of about several tens of meters) and the radar output cannot be used in other than the rough determination, thus demanding a high skill of controllers.

In various countries, a surveillance system has been implemented, which permits each control target to acquire its positional data through a satellite navigation system such as a GPS (Global Positioning System) and to send the positional data via a communications line in response to a request from a control equipment. This surveillance system synchronizes the reference time of the control equipment with that of a control target and time-divisions the communications line to assign time slots to the individual control targets from the control equipment, thereby acquiring the positional data from the entire control targets.

Since this surveillance system should assign time slots one by one to the individual control targets from the control equipment, however, the communications line should be separated into two for the transmission period and the reception period. What is more, this surveillance system requires the identification (ID) data of each control target for both transmission and reception. This requires a considerably wide time slot just for the request of the positional data of one control target and the response to that request. In view of the effective period (at least about 1 second) for acquiring positional data for the surveillance purpose, the number of control targets should be limited severely (to about 1500 targets), which is not sufficient for an expected increase in the quantity of control targets.

A satellite navigation system mounted on an airplane which is to be a control target acquires positional data during flight, and the precision of the data is effective merely in a range of several tens of meters. The positional data acquired by such a satellite navigation system can hardly be used effectively for the surveillance of an airport surface.

A surveillance system in which each control target transmits its own positional data to the control equipment at its own timings has been implemented at airports which involve a relatively small number of control targets. This system is premised on that there are not many chances that a plurality of control targets simultaneously transmit positional data to the control equipment. In consideration of possible fatal accidents at airports, however, there are exceptionally few airports which can employ this surveillance system.

The existing air traffic controls are designed to detect the position of a control target by means of a radar system sited on the ground and transmit the positional data to the control equipment, or transmit positioning data, acquired on the control target side through a satellite navigation system, to the control equipment via a VHF communications line. When the control equipment receives the positioning data of the control target sent by either method, the electronic computer located in the control equipment outputs the position of the control target on a display device based on the transmitted positioning data of the control target and the positioning time, and surveillance is carried out based on the display data.

With regard to a control target flying over a specific zone where no radar or VHF waves can reach, such as an airplane flying over an ocean line, the positional data obtained by the control target itself is voiced down to a relay center on the ground via an HF communications line and is then sent to the electronic computer from the relay center via a ground data link line.

In this case, the positioning data of each control target is transmitted nearly once per hour. Accordingly, the electronic computer should predict the position of each control target at the present time and the precision of this predicted position is not so high.

To shorten the time interval of the transmission of the positioning data of a control target to a relay center on the ground, some measures should be taken to cope with an insufficient amount of relay lines and the relay loads. Without overcoming those problems, the flight intervals of each of control targets cannot be reduced. That is, the safety cannot be maintained unless long flight intervals should be defined for each control target, thus greatly restricting the operation of ocean lines.

To solve those problems, a satellite communications system has been under development, which permits data link communication involving no voice link in transmitting the positioning data of a control target to a control equipment on the ground. The operation of this satellite communications system requires that each control target be equipped with communication means which enables the satellite communications. This burdens a considerable amount of cost on each control target.

SUMMARY OF THE INVENTION

As discussed above, conventionally, there is no effective system which monitors the positions of many control targets and there is a strong demand of a quick solution to cope with an expected increase in the number of control targets.

Further, conventionally there is no effective system which can monitor the positions of many control targets over a specific zone, such as an ocean, without suffering a considerable amount of extra cost. Likewise, there is a strong demand of a quick solution which can cope with an expected increase in the number of control targets.

Accordingly, it is an object of the present invention to provide a control target surveillance system, which can acquire positional data of many control targets over a specific zone in a short period of time with fewer communications lines and at high precision, and which puts less burden on the control targets.

According to the present invention, there is provided a control target surveillance system for allowing a control equipment to monitor positions of a plurality of control targets in a control zone, which system comprises:

time adjusting means for making times, managed by the plurality of control targets and the control equipment, coincide with one another;

positional data obtaining means, installed on each of the control targets, for obtaining at least local positional data using a satellite navigation system;

positional data transmitting means, installed on each of the control targets and being managed with times adjusted by the time adjusting means, for transmitting the positional data, obtained by the positional data obtaining means, to the control equipment via a specific communications line within a period of a time slot corresponding to an identification code previously affixed;

positional data receiving means, provided at the control equipment, for receiving positional data sent from each control target via the communications line;

control target discriminating means, provided at the control equipment and being managed with times adjusted by the time adjusting means, for, with regard to each positional data received at the positional data receiving means, obtaining a corresponding identification code from a time slot of a reception time of the positional data to thereby discriminate the control target which has sent the positional data; and display means, provided at the control equipment, for displaying positions based on the received data and a result of the control target discrimination every given surveillance cycle, whereby the surveillance cycle is time-divided by at least a plurality of previously prepared identification codes to determine time slots corresponding to the identification codes, and the identification codes are previously given to the plurality of control targets in such a way as not to overlap one another to thereby assign the time slots to the control targets.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a diagram showing the contents of the specific processing of a surveillance processor of the first embodiment;

FIG. 4 is a diagram for explaining the operational method of the first embodiment;

FIG. 5 is a diagram showing the structure of a control target surveillance system according to a second embodiment of the present invention;

FIG. 7 is a diagram showing the structure of a control target surveillance system according to a third embodiment of the present invention;

FIG. 8 is a diagram showing the structure of a control target surveillance system according to a fourth embodiment of the present invention;

FIG. 10 is a block diagram showing the specific structure of a target detector of a surveillance subsystem of the fourth embodiment;

FIG. 11 is a block diagram showing the specific structure of a surveillance processor of the surveillance subsystem of the fourth embodiment;

FIG. 14 is a diagram showing the correlation among the grid point positions of control targets, transmission slots and ID codes, exemplified in FIGS. 12 and 13;

FIGS. 15A and 15B are a diagram exemplifying another pattern of the airport-surface coordinate system;

FIG. 16 is a block diagram showing the structure of a control target surveillance system according to a fifth embodiment of the present invention;

FIG. 17 is a block diagram showing the specific structure of an on-target subsystem of the fifth embodiment;

FIG. 18 is a block diagram showing the specific structure of a slave station of the fifth embodiment;

FIG. 19 is a block diagram showing the specific structure of a master station of the fifth embodiment;

FIG. 20 is a block diagram showing the specific structure of a surveillance subsystem of the fifth embodiment;

FIG. 24 is a diagram for explaining the fundamental concept of a position computing process according to the fifth embodiment;

DETAILED DESCRIPTION OF THE PREFERRED EMBODIMENTS

Preferred embodiments of the present invention will now be described referring to the accompanying drawings.

Figure 1:
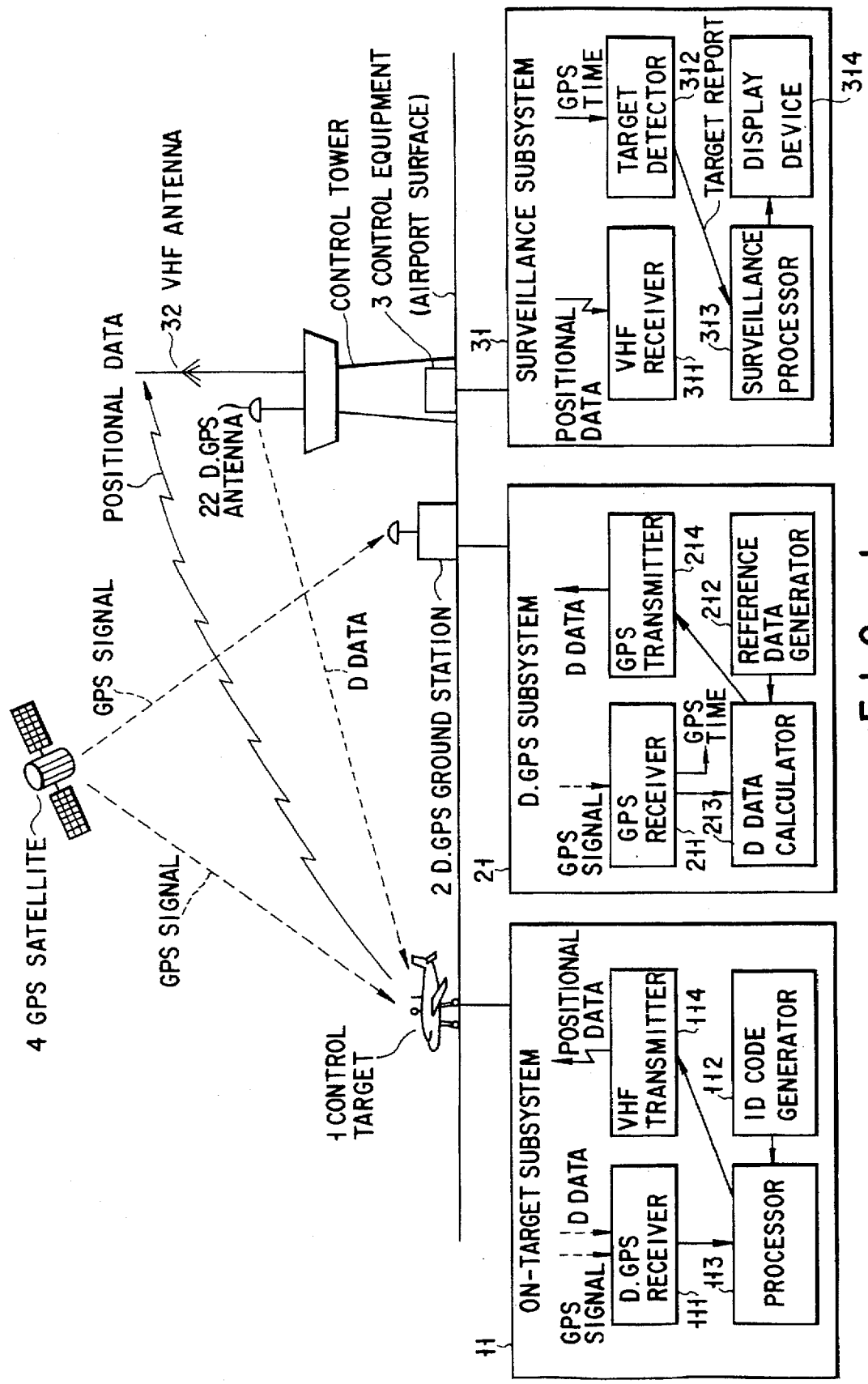
FIG. 1 is a diagram showing the structure of a control target surveillance system according to a first embodiment of the present invention.

FIG. 1 illustrates a control target surveillance system according to a first embodiment of this invention. FIG. 1 shows the structure of the system that monitors airplanes and vehicles, located in an airport surface, as control targets.

In FIG. 1, "1" denotes a control target, "2" denotes a differential GPS (hereinafter referred to as "D. GPS") ground station, which is located at a known position on the airport surface and acquires and transmits differential data (hereinafter referred to as "D data"), "3" denotes a control equipment in a control tower, and "4" is a GPS satellite as a navigation satellite. (Although three or more GPS satellites are needed to actually obtain positional data, only one is illustrated for descriptive simplification.)

Reference numeral "11" denotes an on-target subsystem 11 which is mounted on each control target 1. This subsystem 11 is equipped with a navigation system (e.g., GPS or INS) for detecting the local position. In this example, to constitute a D. GPS capable of obtaining highly accurate positional information, the subsystem 11 uses a D. GPS receiver (including a D. GPS antenna) 111 to receive a GPS signal from the GPS satellite 4 to thereby acquire a GPS time and local positional data and to receive a pseudo GPS signal to be described later, and compensates the positional data based on D data included in this pseudo GPS signal.

The subsystem 11 further includes an ID code generator 112, a processor 113 and a VHF transmitter (including a VHF antenna) 114.

The ID code generator 112 is accomplished by using an SSR code generator incorporated in a transponder, which is installed on an airplane. For airplanes, the ID code generator 112 directly uses SSR codes, already assigned to the airplanes. With regard to vehicles or the like, the generator 112 assigns SSR codes, assigned to an airport, to the vehicles.

The processor 113 edits positional data, obtained through the D. GPS receiver 111, in a predetermined format, and manages the transmission time of edited data based on an ID code from the ID code generator 112 with the GPS time, obtained by the D. GPS receiver 111, as a reference.

The VHF transmitter 114 sends the positional data, edited by the processor 113, to the control equipment 3 via a communications line (VHF line in this case) that can ensure direct data communication with the control equipment 3.

Reference numeral "21" denotes a D. GPS subsystem located in the D. GPS ground station 2, and reference numeral "22" is a D. GPS antenna (also called a pseudo GPS satellite), arranged at the top of the control tower. The D. GPS subsystem 21 has a GPS receiver 211, a reference data generator 212, a D data calculator 213 and a GPS transmitter 214.

The GPS receiver 211 obtains local positional data and GPS time from a GPS signal sent from the GPS satellite 4.

The reference data generator 212 generates (known) positional data of the ground station 2 in this surveillance system. The D data calculator 213 compares the positional data obtained by the GPS receiver 211 with the positional data generated by the reference data generator 212 and computes the difference between those data to calculate differential data. The GPS transmitter 214 sends the D data, obtained by the D data calculator 213, to each control target 1 via the D. GPS antenna 22.

Reference numeral "31" denotes a surveillance subsystem located in the control equipment 3, and reference numeral "32" is a VHF antenna arranged at the top of the control tower. The surveillance subsystem 31 has a VHF receiver 311, a target detector (DIG) 312, a surveillance processor 313 and a display device 314.

The VHF receiver 311 receives positional data from each control target 1 received at the VHF antenna 32.

Figure 2:
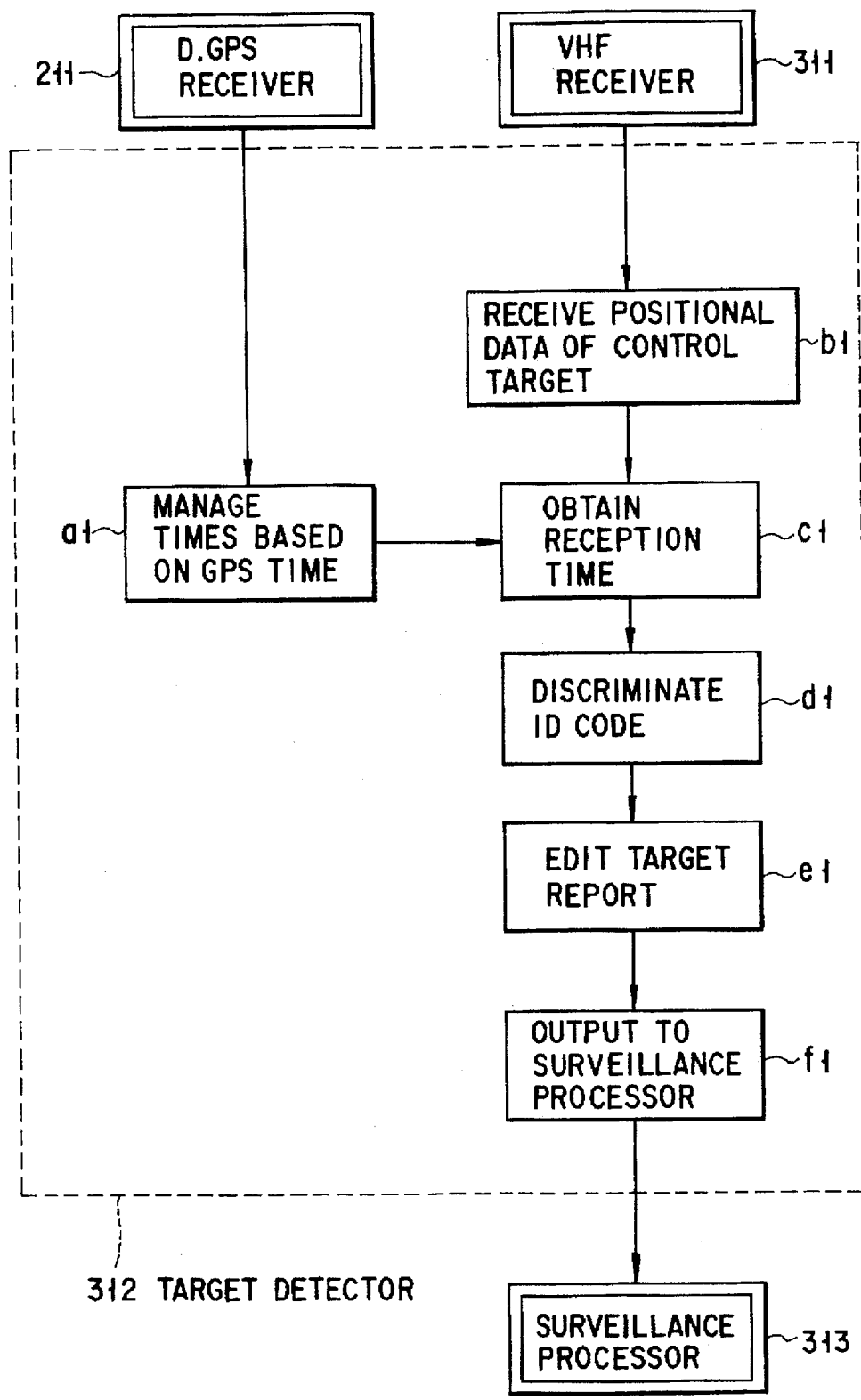
FIG. 2 is a diagram showing the contents of the specific processing of a target detector of the first embodiment.

The target detector 312 specifically performs an editing process as illustrated in FIG. 2. The target detector 312 manages times based on the GPS time obtained at the GPS receiver 211 of the D. GPS subsystem 21 (step a1), receives positional data sequentially obtained by the VHF receiver 311 (step b1) to obtain the reception time (step c1), discriminates the ID code of the data sender (control target) from the reception time (step d1), edits and prepares a target report associating the ID code, positional data and reception time with one another (step e1), and outputs the target report to the surveillance processor 313 (step f1).

The surveillance processor 313 specifically performs an editing process as illustrated in FIG. 3. The surveillance processor 313 communicates with another facility, such as an FDP (Flight Data Processing), ARTS (Automated Radar Terminal System) or ASDE (Airport Surface Detection Equipment) via an interface (not shown) to collect data files for surveillance (step g1), and prepares and registers a surveillance file (step h1).

The surveillance processor 313 receives the target report, prepared by the target detector 312 (step i1), performs correlation of the surveillance file with the target report to discriminate and specify type data (aircraft identification code (call sign), vehicle number, or the like) of a control target 1 corresponding to the ID code (step j1), tracks the control target based on the result of each correlation process (step k1), and updates the surveillance file based on the tracking result (step l1). The type data and positional data of every control target 1, obtained in the above manner, are edited together with data from an airport data file (airport surface map or the like) in a predetermined format to prepare display data (step m1), and outputs the display data to the display device 314 (step n1).

The display device 314, located in the control room or associated sections, displays the display data from the surveillance processor 313 on, for example, a PPI (Plan Position Indicator) to present the controller or the like with the data.

The operation of the system with the above-described structure will be described specifically.

First, to monitor the position of a control target, a cycle of acquiring its positional data should fall within at least about 1 second. The SSR code generator in a transponder mounted on an airplane can set a 4-digit numeral (0001 to 7777), each digit being any of 0 to 7. If this SSR code generator is used for the ID code generator 112 that is mounted on each control target 1, different ID codes can be assigned to 4096 control targets.

According to the system of this embodiment, therefore, airplanes given SSR codes are assigned with those SSR codes as ID codes, while other vehicles or the like are assigned with SSR codes assigned to an airport in such a way as not to overlap one another. As shown in FIG. 4, the airport surface surveillance cycle is set to 1 (sec/cycle) and is time-divided to 4096 time slots (one time slot= 244.14≈250 μs) with the GPS time as a reference, and the divided first time slot to the 4096-th time slot are assigned to the transmission periods of positional data of control targets in the order of younger ID codes.

In the example in FIG. 4, the airplane given the ID code (SSR code) of "0001" sends its positional data in the period of the first time slot, the airplane given the ID code of "0003" sends its positional data in the period of the third time slot, and the vehicle given the ID code of "7777" sends its positional data in the period of the 4096-th time slot.

The above assignment of time slots permits the surveillance subsystem to discriminate an ID code from the time slot number at the data reception time and specify the control target, thus eliminating the need for the exchange of the ID code between each control target and the control equipment. Further, the control equipment need not instruct the transmission time to each control target.

Since the surveillance system with the above structure treats the GPS time as a reference, it can easily and accurately match the times managed by all control targets with those managed by the control equipment. This way, the accurate assignment of time slots can be accomplished.

The use of the differential GPS system allows a control target to obtain highly accurate positional data (in nearly the 1-m order) simply by simultaneously sending the D data, obtained at the D. GPS ground station 2 in the airport surface, to every control target. Accordingly, the control equipment simply needs to collect the positional data from each control target to accomplish a highly accurate mapping display, which can sufficiently be used for the surveillance of the individual control targets.

According to the control target surveillance system with the above-described structure, therefore, the positional data of many control targets in the airport surface can be obtained at high precision via fewer communications lines and in a short period of time. Further, as the SSR code generator already mounted on an airplane is used, less burden will be put on control targets and considerable cost reduction will be expected in building this system.

In this embodiment, the differential data obtained by the D. GPS ground station 2 is sent to each control target 1 from the D. GPS antenna 22 located at the top of the control tower. Because the differential data consists of relatively few bits and should be sent to all the control targets simultaneously, if a part of the VHF line that is transmitting positional data is used for the transmission of the differential data, the efficiency of acquiring the positional data is not affected much.

FIG. 5 illustrates the structure of a second embodiment of this invention designed in view of the above point. In FIG. 5, like or same reference symbols as used in FIG. 1 are also used to denote corresponding or identical parts to avoid repeating their descriptions.

The on-target subsystem 11, mounted on each control target 1, further includes a VHF receiver (including a VHF antenna) 115. The D. GPS subsystem 21 in the D. GPS ground station 2 is equipped with a VHF transmitter 215 in place of the GPS transmitter 214. This VHF transmitter 215 uses the aforementioned VHF antenna to send D data to individual control targets at previously assigned times using the VHF line that is used for the transmission of positional data.

The operation of the system with the above structure will be described specifically with reference to FIG. 6.

As mentioned earlier, the time required for the transmission of differential data hardly differs from the time required for the transmission of positional data. Even if the airport surface surveillance cycle, when set to 1 (sec/cycle), is time-divided to 4096+1 time slots, one time slot is 244.08≈250 μs, which does not affect the transmission of positional data. Therefore, the airport surface surveillance cycle is set to 1 (sec/cycle) and is time-divided to 4097 time slots with the GPS time as a reference, and the divided first time slot to the 4096-th time slot are assigned to transmission periods of positional data of control targets in the order of younger ID codes while the 4097-th time slot is assigned to the transmission period of D data from the D. GPS ground station 2, as shown in FIG. 6.

Figure 6:
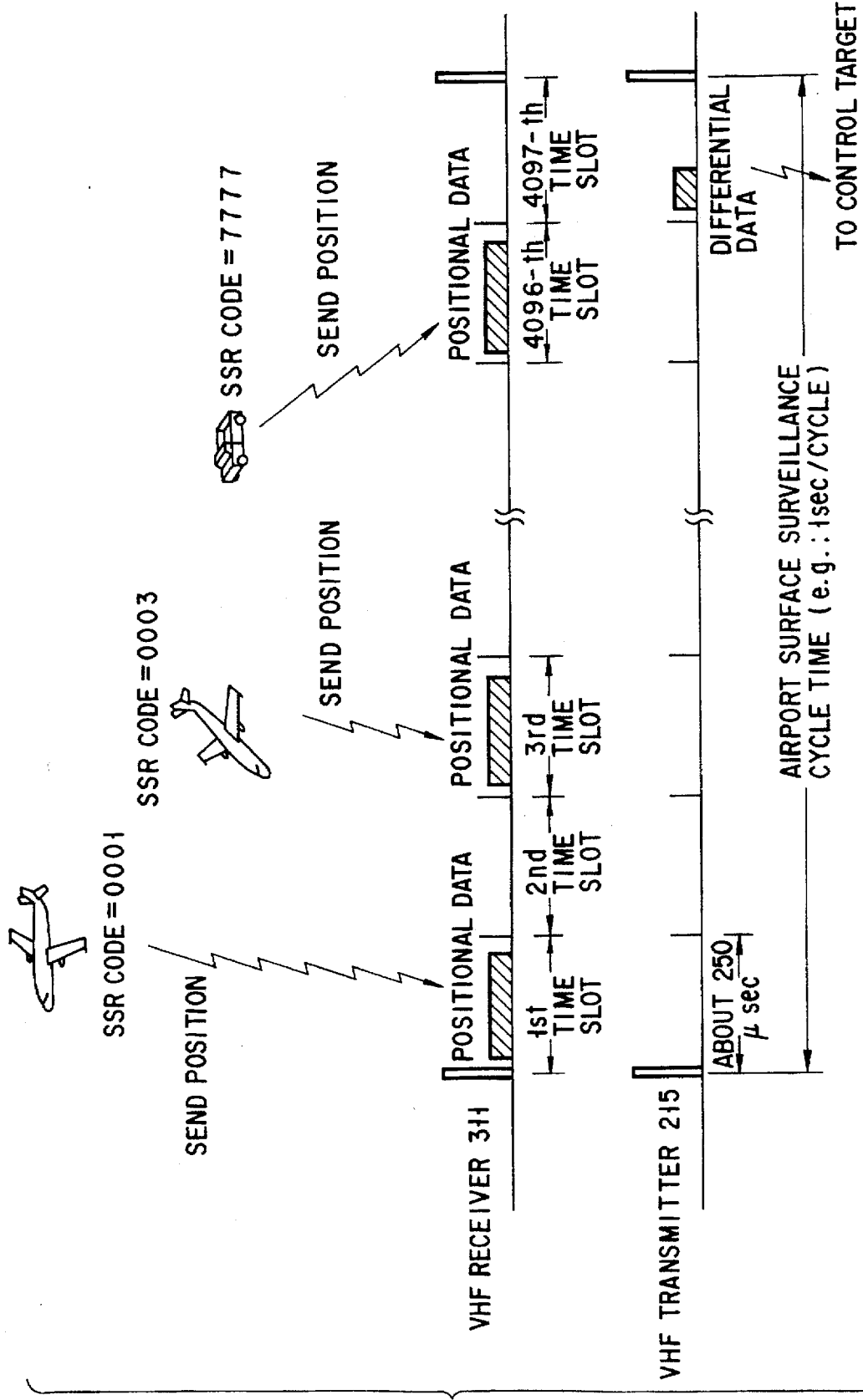
FIG. 6 is a diagram for explaining the operational method of the second embodiment.

In the example in FIG. 6, as in the example of FIG. 4, the airplane given the ID code (SSR code) of "0001" sends its positional data in the period of the first time slot, the airplane given the ID code of "0003" sends its positional data in the period of the third time slot, and the vehicle given the ID code of "7777" sends its positional data in the period of the 4096-th time slot.

This assignment of time slots eliminates the need for the D. GPS antenna for transmitting differential data, contributing to the cost reduction for the system. Further, since one communications line is used for data transmission and reception, the present system can be accomplished with one frequency band. This is very effective in the case where the frequency allocation is difficult.

Although the D. GPS receiver is mounted on a control target and differential data is sent to each control target from the control equipment in the above-described embodiment, the D. GPS receiver may be installed in the control equipment and no differential data may be sent to the control targets but the positional data of the control targets may be compensated on the control equipment side.

FIG. 7 illustrates the structure of a third embodiment of this invention designed in view of the above point. In FIG. 7, like or same reference symbols as used in FIG. 1 are also used to denote corresponding or identical parts to avoid repeating their descriptions. The following description therefore centers on the differences.

The significant difference of the third embodiment from the first embodiment in FIG. 1 is that the on-target subsystem 11 uses a GPS receiver 116 in place of the D. GPS receiver 111 and the target detector 312 in the surveillance subsystem 31 is provided with the function to compensate positional data using the D data.

The GPS receiver 116 receives the GPS signal from the GPS satellite 4 and acquires the GPS time, local positional data and the ID number of the navigation satellite used in the positioning job (hereinafter referred to as "satellite ID").

The processor 113 edits the positioning data obtained at the GPS receiver 116 in a predetermined format.

The VHF transmitter 114 sends to the control equipment the positioning data, which is the positional data affixed with the satellite ID and has been edited by the processor 113. This positioning data is received at the VHF antenna 32, and the VHF receiver 311 of the surveillance subsystem 31 obtains the received data.

The GPS receiver 211 of the D. GPS ground station 2 obtains the local positional data, GPS time and the shoot range of the full visual navigation satellite (the distance between the GPS satellite and the ground station) from the GPS signal from the GPS satellite 4. The reference data generator 212 generates the (known) positional data of the ground station 2.

The D data calculator 213 is supplied with the known positional data, generated by the reference data generator 212, the satellite ID, used by the control target for its positioning and sent from the VHF receiver 311, and the data received at the GPS receiver 211. The D data calculator 213 acquires local positional data from those received data based on the satellite information from the same navigation satellite as used by the control target for its positioning, and compares the obtained positional data with the known positional data to compute differential data.

This differential data (D data) is sent to the target detector 312 of the surveillance subsystem 31. The target detector 312 is supplied with the positional data of the control target from the VHF receiver 311, and this positional data is compensated based on the D data.

This embodiment requires just a single line between the individual control targets and the control equipment and eliminates the need for the D. GPS antenna 22 in FIG. 1.

FIG. 8 illustrates a control target surveillance system according to a fourth embodiment of this invention. FIG. 1 shows the structure of the system that monitors airplanes and vehicles, located in an airport surface, as control targets. In FIG. 8, like or same reference symbols as used in FIG. 1 are also used to denote corresponding or identical parts.

In FIG. 8, "1" denotes a control target, "2" denotes a D. GPS ground station, which is located at a known position on the airport surface and acquires and transmits D data of the D. GPS, "3" denotes a control equipment in a control tower, and "4" is a GPS satellite as a navigation satellite. (Although three or more GPS satellites are needed to actually obtain positional data, only one is illustrated for descriptive simplification.)

Reference numeral "11" denotes an on-target subsystem 11 which is mounted on each control target 1. This subsystem 11 is equipped with a navigation system (e.g., GPS or INS) for detecting the local position. In this example, to constitute a D. GPS capable of obtaining highly accurate positional information, the subsystem 11 uses a D. GPS receiver (including a D. GPS antenna) 111 to receive a GPS signal from the GPS satellite 4 to thereby detect the GPS time and to detect the local position, and compensates the positioning data based on D data that is supplied separately.

The subsystem 11 further includes a data processor 117 and a VHF transmitter/receiver (including a VHF antenna) 118. The VHF transmitter/receiver 118 receives the D data sent from the D. GPS ground station 2 via a predetermined communications line of a VHF band and sends it to the data processor 117, or sends the ID code supplied from the data processor 117 to the control equipment 3 via the communications line.

Figure 9:
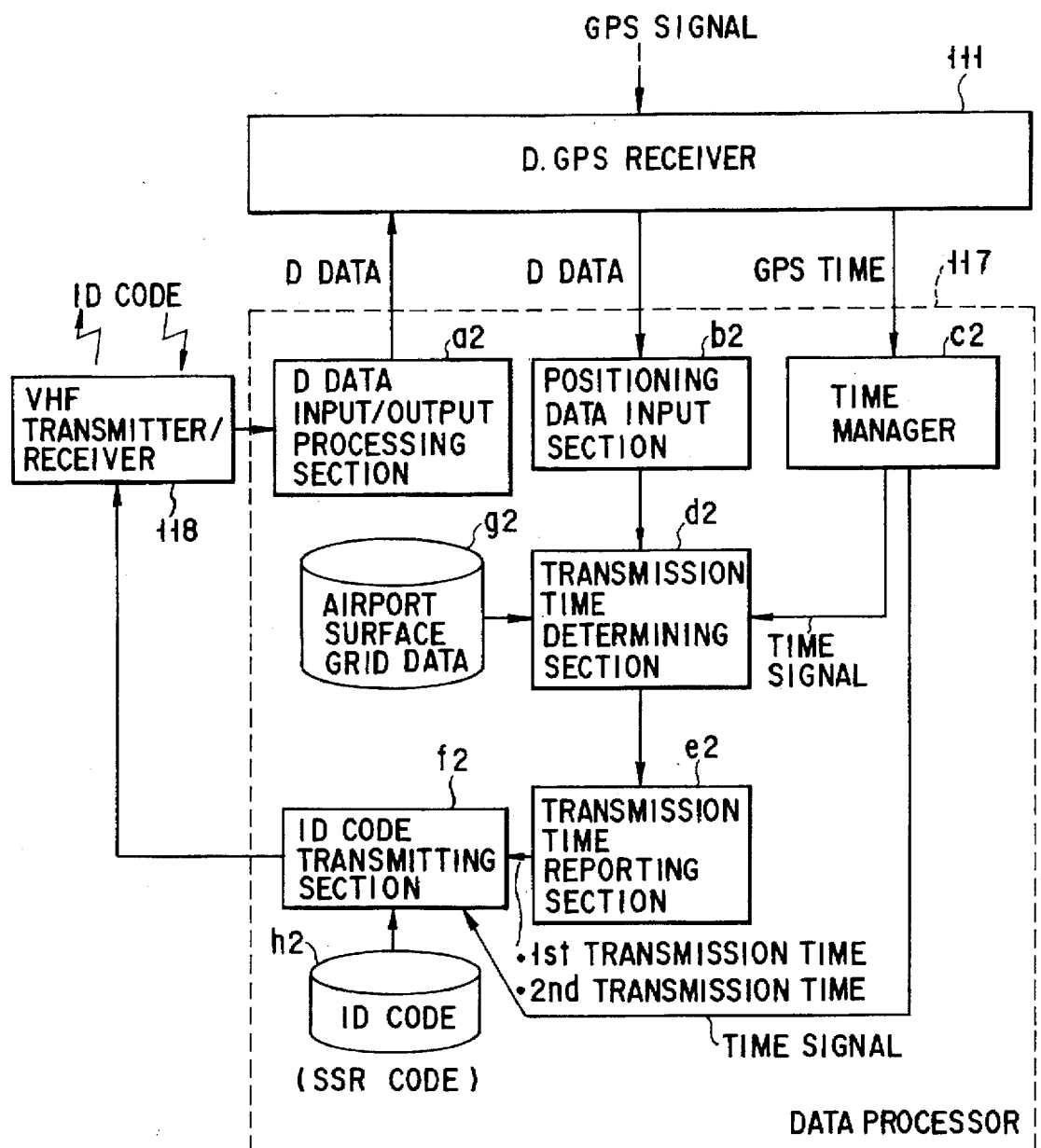
FIG. 9 is a block diagram showing the specific structure of a data processing unit of an on-target subsystem of the fourth embodiment.

The specific structure of the data processor 117 will be discussed with reference to FIG. 9.

A D data input/output processing section a2 extracts D data from the received signal sent from the VHF transmitter/receiver 118 and outputs the D data to the D. GPS receiver 111. A positioning data input section b2 receives local positioning data, obtained by the D. GPS receiver 111, converts it in a predetermined format and sends the resultant data to a transmission time determining section d2. A time managing section c2 matches the managed time with the GPS time obtained by the D. GPS receiver 111, and sends a time signal to the transmission time determining section d2 and an ID code transmitting section f2.

The data processor 117 is previously given an airport surface grid data file g2. This airport surface grid data file g2 shows the correlation between the positions of individual grid points in the coordinate system, which is the airport surface segmented in a mesh form in an arbitrary pattern, and the time slots. Each grid point is expressed by the intersection of two axes and a time slot is assigned for each axis.

The transmission time determining section d2 refers to the grid data file to obtain a grid point closest to the position indicated by the positioning data and discriminate the first and second time slots assigned to this grid point to determine the transmission time in the associated time slots with the time signal taken as a reference. The transmission time information is sent to a transmission time reporting section e2.

This transmission time reporting section e2 sends the transmission time information to an ID code transmitting section f2 so that the transmitting section f2 outputs an ID code at the first and second transmission times. This ID code transmitting section f2 transmits the ID code from an ID code generator h2 to the control equipment 3 via the VHF transmitter/receiver 118 at the first and second transmission times with the time signal as a reference.

The ID code generator h2, which is accomplished by using the SSR code generator incorporated in the transponder mounted on an airplane, uses already assigned SSR codes for airplanes and assigns SSR codes assigned to an airport for vehicles or the like.

Reference numeral "21" denotes a D. GPS subsystem located in the D. GPS ground station 2. This D. GPS subsystem 21 has a GPS receiver 211, a D data calculator 217, a VHF transmitter/receiver 218 and a VHF antenna 219. The VHF antenna 219 is located at the top of the control tower.

The GPS receiver 211 receives a GPS signal sent from the GPS satellite 4 to obtain the positioning data of the local position and GPS time. The D data calculator 217 compares the (known) positional data of the ground station 2, previously obtained, with the positioning data obtained by the GPS receiver 211 and computes the difference between those data to calculate D data. The VHF transmitter/receiver 218 sends the D data to each control target 1 via the VHF antenna 219 at the predetermined transmission time with the GPS time as a reference. The VHF transmitter/receiver 218 receives the ID code from each control target 1 and sends it to the control equipment 3.

Reference numeral "31" denotes a surveillance subsystem located in the control equipment 3. This surveillance subsystem 31 has a target detector 312, a surveillance processor 313 and a display device 314.

The target detector 312 has the specific structure as illustrated in FIG. 10.

A time managing section i2 manages times based on the GPS time obtained at the GPS receiver 211 of the D. GPS subsystem 21. An ID code input section j2 receives the received signal from the VHF transmitter/receiver 218, located in the D. GPS subsystem 21, to sequentially discriminate the ID codes, and reports the reception timings to a slot number discriminating section k2.

The slot number discriminating section k2 obtains times at the ID code reception timings with the time signal supplied from the time managing section i2 as a reference, and determines the time slot numbers corresponding to the reception times. A target report editing section 12 edits the slot numbers and ID codes, sequentially obtained by the sections j2 and k2, and prepares a target report. This target report is sent via an output section m2 to the surveillance processor 313.

The surveillance processor 313 has the specific structure as illustrated in FIG. 11.

The surveillance processor 313 communicates with another facility, such as an FDP (Flight Data Processing), ARTS (Automated Radar Terminal System) or ASDE (Airport Surface Detection Equipment) via an other-facility surveillance data communication section n2 to collect other-facility surveillance data, sends this data to a surveillance file storage section o2 to be stored in a surveillance file.

Upon reception of the target report, prepared by the target detector 312, via a target report input section p2, a correlation section q2 performs correlation of the surveillance file with each target report to discriminate and specify type data (aircraft identification code (call sign), vehicle number, or the like) of a control target 1 corresponding to the ID code. Further, a tracking section r2 tracks the control target based on the result of each correlation process, and the surveillance file is updated by a surveillance file updating section s2 based on the tracking result.

Stored previously in an airport data file storage section t2 is a grid data file which shows the correlation between the positions of the individual grid points in the coordinate system and the time slots. After the tracking process, a display data editing section u2 refers to the grid data file in the airport data file storage section t2 to obtain the positional data of the grid point corresponding to each slot number in the target report, and this positional data together with the type data obtained by the correlation section q2 is edited in a predetermined format to prepare display data. This display data is sent via a display data output section v2 to the display device 314.

The display device 314, located in the control room or associated sections, displays the display data from the surveillance processor 313 on, for example, a PPI to present the controller or the like with the data.

The operation of the system with the above-described structure will be described specifically with reference to FIGS. 12 through 14.

First, to monitor the position of a control target, the surveillance cycle should be set within at least about 1 second. The SSR code generator in a transponder mounted on an airplane can set a 4-digit numeral (0001 to 7777), each digit being any of 0 to 7. If this SSR code generator is used for the ID code generator 112 that is mounted on each control target 1, different ID codes can be assigned to 4096 control targets.

According to the system of this embodiment, therefore, airplanes given SSR codes are assigned with those SSR codes as ID codes, while other vehicles or the like are assigned with SSR codes assigned to an airport in such a way as not to overlap one another.

The coordinate system, which is the airport surface segmented in a mesh form in an arbitrary pattern, should have been determined and the positions of the individual grid points should have been measured. One example is shown in FIG. 12. This example shows a rectangular coordinate system whose individual grid points are expressed by (n, m). In this example, an airplane (1) with an SSR code of "1111" is indicated to be located at the position of the grid point (3, 2), an airplane (2) with an SSR code of "2222" is indicated to be located at the position of the grid point (7, 4), and a vehicle (3) with an SSR code of "3333" is indicated to be located at the position of the grid point (10, 3).

Figure 13:
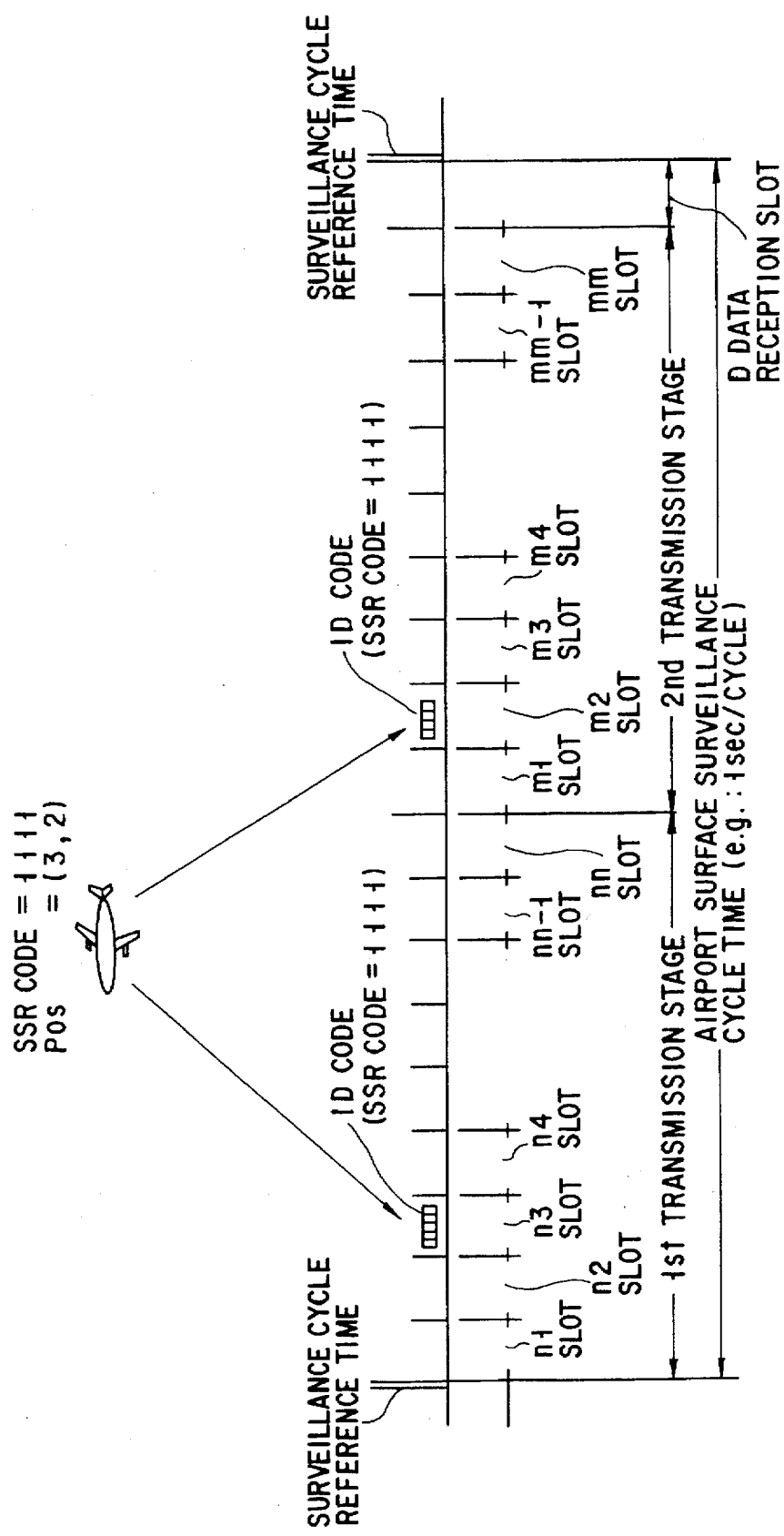
FIG. 13 is a diagram showing an example of time-division of an airport-surface surveillance cycle for time slots according to the fourth embodiment.

As shown in FIG. 13, the airport surface surveillance cycle is set to 1 (sec/cycle) and is time-divided to a first transmission stage consisting of n time slots n1 to nn, a second transmission stage consisting of m time slots m1 to mm, and a time slot for the transmission and reception of differential data. The individual time slots n1 to nn in the first transmission stage are associated with n-axis data of the grid points, and the individual time slots m1 to mm in the second transmission stage are associated with m-axis data of the grid points.

The correlation between the axis data (n, m) of the grid points in the coordinate system and the time slot numbers has previously been converted to a file, which has been given to the data processor 112 and the surveillance processor 313 of the surveillance subsystem 31.

Each control target 1 receives differential data obtained by the D. GPS ground station 2, and compensates the positioning data obtained from the GPS signal to thereby detect the local position at high precision. The control target 1 discriminates the time slots in the first and second transmission stages from the axis data (n, m) of the grid point corresponding to that local position, and sends the local ID code within each time slot.

Figure 12:
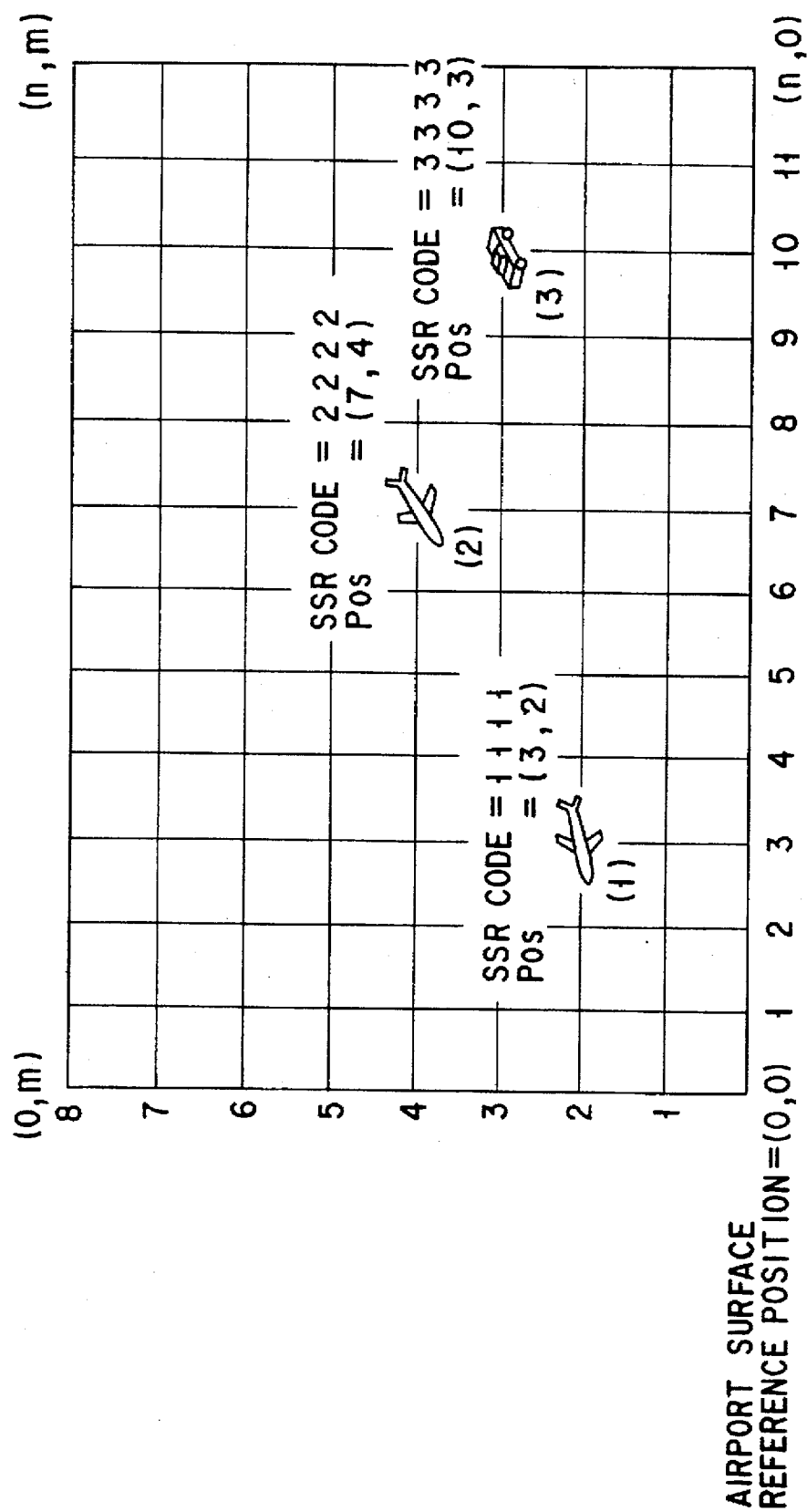
FIG. 12 is a diagram exemplifying a pattern of an airport-surface coordinate system according to the fourth embodiment.

Referring to FIGS. 12 and 13, the airplane (1) with the SSR code=1111 shown in FIG. 12, whose grid point position Pos=(n, m) corresponding to the positioning data is n=3 and m=2, sends the ID code "1111" at the times corresponding to the n3 slot in the first transmission stage and the m2 slot in the second transmission stage, as shown in FIG. 13. Likewise, the airplane (2) with the SSR code=2222 and Pos=(7, 4) sends the ID code "2222" at the times corresponding to the n7 slot in the first transmission stage and the m4 slot in the second transmission stage, and the vehicle (3) with the SSR code=3333 and Pos=(10, 3) sends the ID code "3333" at the times corresponding to the n10 slot in the first transmission stage and the m3 slot in the second transmission stage. The above relations are illustrated together in FIG. 14.

By preparing the coordinate system of the airport surface, previously specifying the relation between the grid points and the time slots, obtaining the grid point corresponding to the GPS positioning data on the control target side and sending the ID code in the associated time slots from the control target, the surveillance subsystem can specify the control target from the received ID code, and can discriminate the grid point from the time slot numbers at the reception times of the ID code to thereby specify the position of the control target. Thus, the control equipment need not individually instruct the transmission times to the control targets or each control target need not send positioning data containing a vast amount of information to the control equipment. It is therefore possible to set the surveillance cycle to a relatively short period, and collect and display positional information of many control targets.

Although the SSR codes are used as ID codes in the above embodiment, Mode addresses, or airplane and vehicle numbers may be used instead.

Further, since the surveillance system with the above structure treats the GPS time as a reference, it can easily and accurately match the times managed by all control targets with those managed by the control equipment. This can ensure the accurate assignment of time slots.

The use of the differential GPS system allows a control target to obtain highly accurate positional data (in nearly the 1-m order) simply by simultaneously sending the D data, obtained at the D. GPS ground station 2 in the airport surface, to every control target. Accordingly, the control equipment simply needs to collect the positional data from each control target to accomplish a highly accurate mapping display, which can sufficiently be used for the surveillance of the individual control targets.

Further, since this surveillance system uses one communications line for both the data transmission and reception, this system is very effective in the case where the frequency allocation is difficult.

According to the control target surveillance system with the above-described structure, therefore, the positional data of many control targets in the airport surface can be obtained at high precision via fewer communications lines and in a short period of time. Further, as the SSR code generator already mounted on an airplane is used, less burden will be put on control targets and considerable cost reduction will be expected in building this system.

In this embodiment, the differential data obtained by the D. GPS ground station 2 is sent to each control target 1 via the ID code communications line. However, the D. GPS subsystem 21 may be equipped with a D. GPS transmitter and a D. GPS antenna may be arranged at the top of the control tower so that the differential data can be sent as a pseudo GPS signal which should be received directly by the D. GPS receiver 111 of the control target 1.

This structure requires no assignment of the time slots for the transmission and reception of differential data in the surveillance cycle, thus allowing the number of grid points to be increased or allowing the surveillance cycle to be shortened.

In the above embodiment, the rectangular coordinate system has been described as the airport surface coordinate system. In this case, when a plurality of control targets are positioned on the same axis, the ID codes are sent at the same time. To avoid this simultaneous transmission, the pattern of the coordinate system should be modified to design the individual axes as, for example, curved lines as shown in FIG. 15A or as a combination of parabolic lines and circles as shown in FIG. 15B so that the control targets are not positioned on the same axis. If the grid points are set densely for those areas where multiple control targets are concentrated, and are sparsely for the other areas, the restriction on the number of the time slots can be relaxed.

FIG. 16 illustrates a control target surveillance system according to a fifth embodiment of this invention. FIG. 1 shows the structure of the system that monitors airplanes and vehicles, located in an airport surface, as control targets. In FIG. 16, like or same reference symbols as used in FIG. 1 are also used to denote corresponding or identical parts.

In FIG. 16, "1" denotes a control target, "5" and "6" denote first and second slave stations, which are located at different known positions on the airport surface, "3" denotes a control equipment located in a control tower, "33" denotes a master station located at a known position different from those of the first and second slave stations 5 and 6 (the master station 33 is located in the control equipment 3 in this example), and "4" is a GPS satellite used as a navigation satellite.

Reference numeral "11" denotes an on-target subsystem 11 which is mounted on each control target 1. As shown in FIG. 17, this subsystem 11 comprises a GPS antenna 1111, a GPS receiver 1112, an SSR code generator 1113, a transmission time manager 1114, a pulse generator 1115, a VHF transmitter 1116, and a VHF antenna 1117. For airplanes, the GPS antenna, GPS receiver, SSR code generator, VHF transmitter and VHF antenna already equipped in the airplanes can be used directly. For vehicles or the like, SSR codes assigned to an airport are individually assigned to the vehicles.

In this subsystem 11, the GPS receiver 1112 receives the GPS signal from the GPS satellite 4 via the GPS antenna 1111 and detects the GPS time. This GPS time information is sent to the transmission time manager 1114. This transmission time manager 1114 manages the GPS time as the local time and generates a transmission trigger signal at the start timing of the time slot to which the SSR code previously set to the SSR code generator 1113 is assigned. This transmission trigger signal is sent to the pulse generator 1115.

This pulse generator 1115 generates a pulse signal having a predetermined width upon reception of the transmission trigger signal from the transmission time manager 1114. This pulse signal is sent over a radiowave of a predetermined frequency in the VHF band to the first and second slave stations 5 and 6 and the master station 33 via the VHF transmitter 1116 and VHF antenna 1117.

The first slave station 5 has the specific structure as shown in FIG. 18, and comprises a GPS antenna 511, a GPS receiver 512, a VHF antenna 513, a VHF receiver 514, a time measuring device 515 and a communications line output device 516.

The GPS receiver 512 in the first slave station 5 receives the GPS signal from the GPS satellite 4 via the GPS antenna 511 and detects the GPS time. The VHF receiver 514 receives the pulse signal, sent from the control target 1, via the VHF antenna 513.

The time measuring device 515 detects the start timing of each time slot obtained by time-dividing the surveillance cycle with the GPS time from the GPS receiver 512 as a reference, and causes a counter (COUNT) to start counting at each timing. Upon reception of the pulse from the VHF receiver 514, the time measuring device 515 stops the counting of the counter and converts the count value to a time to compute the measured time to the point of the reception of the transmitted pulse from the control target 1 at the first slave station 5. The communications line output device 516 sends the information of the measured time to the master station 33 via a predetermined communications line.

As the second slave station 6 has quite the same structure as the first slave station 5, the description of its specific structure will not be given.

The master station 33 has the specific structure as shown in FIG. 19, and comprises a GPS antenna 331, a GPS receiver 332, a VHF antenna 333, a VHF receiver 334, a time measuring device 335, a communications line input device 336 and a position calculator 337.

The GPS receiver 332 in the master station 33 receives the GPS signal from the GPS satellite 4 via the GPS antenna 331 and detects the GPS time. The VHF receiver 334 receives the pulse signal, sent from the control target 1, via the VHF antenna 333.

The time measuring device 335 detects the start timing of each time slot obtained by time-dividing the surveillance cycle with the GPS time from the GPS receiver 332 as a reference, and causes a counter (COUNT) to start counting at each timing. Upon reception of the pulse from the VHF receiver 334, the time measuring device 335 detects the time and stops the counting of the counter, converts the count value to a time to compute the measured time to the point of the reception of the transmitted pulse from the control target 1 at the master station 33.

The time information measured in this manner is input together with the measured time information sent from the individual slave stations 5 and 6 to thee position calculator 337 via the communications line input device 336. This position calculator 337, which is based on the LORAN (LOng RAnge Navigation) system, obtains the differences between the measured times at the slave stations 5 and 6 and the measured time at the master station 33, acquires a hyperbolic function indicating the possible loci that will show the time differences between the slave stations 5 and 6, and calculates the position of the intersection of two hyperbolas, thereby acquiring the positioning information of the control target 1 which is the pulse sender.

The GPS time information, pulse reception time information, and positioning information obtained by the master station 33 are sent to a surveillance subsystem 34. This surveillance subsystem 34 has the specific structure as shown in FIG. 20, and comprises a target detector 341, a surveillance processor 342 and a display device 343.

Figure 21:
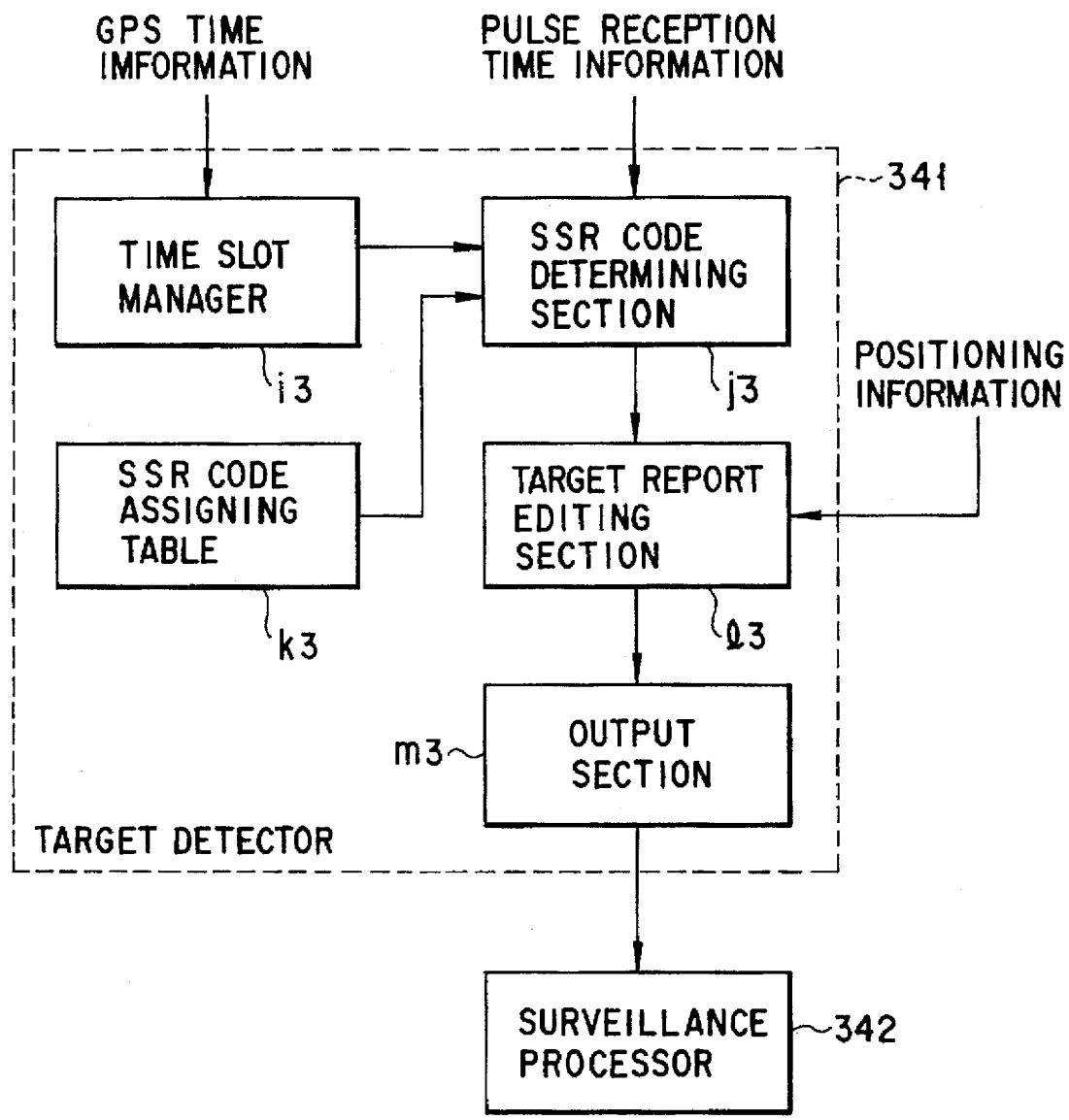
FIG. 21 is a block diagram showing the specific structure of a target detector of the fifth embodiment.

The target detector 341 has the specific structure as illustrated in FIG. 21.

A time slot managing section i3 manages individual time-divided time slot periods based on the GPS time from the master station 33. An SSR code discriminating section j3 refers to the time slots managed by the time slot managing section i3 to discriminate the time slot number, and refers to an SSR code assign table k3 associated with the time slot number to discriminate the associated SSR code. A target report editing section 13 edits the time slot numbers and SSR codes, sequentially obtained by the SSR code discriminating section j3, and prepares a target report. This target report is sent via an output section m3 to the surveillance processor 342.

Figure 22:
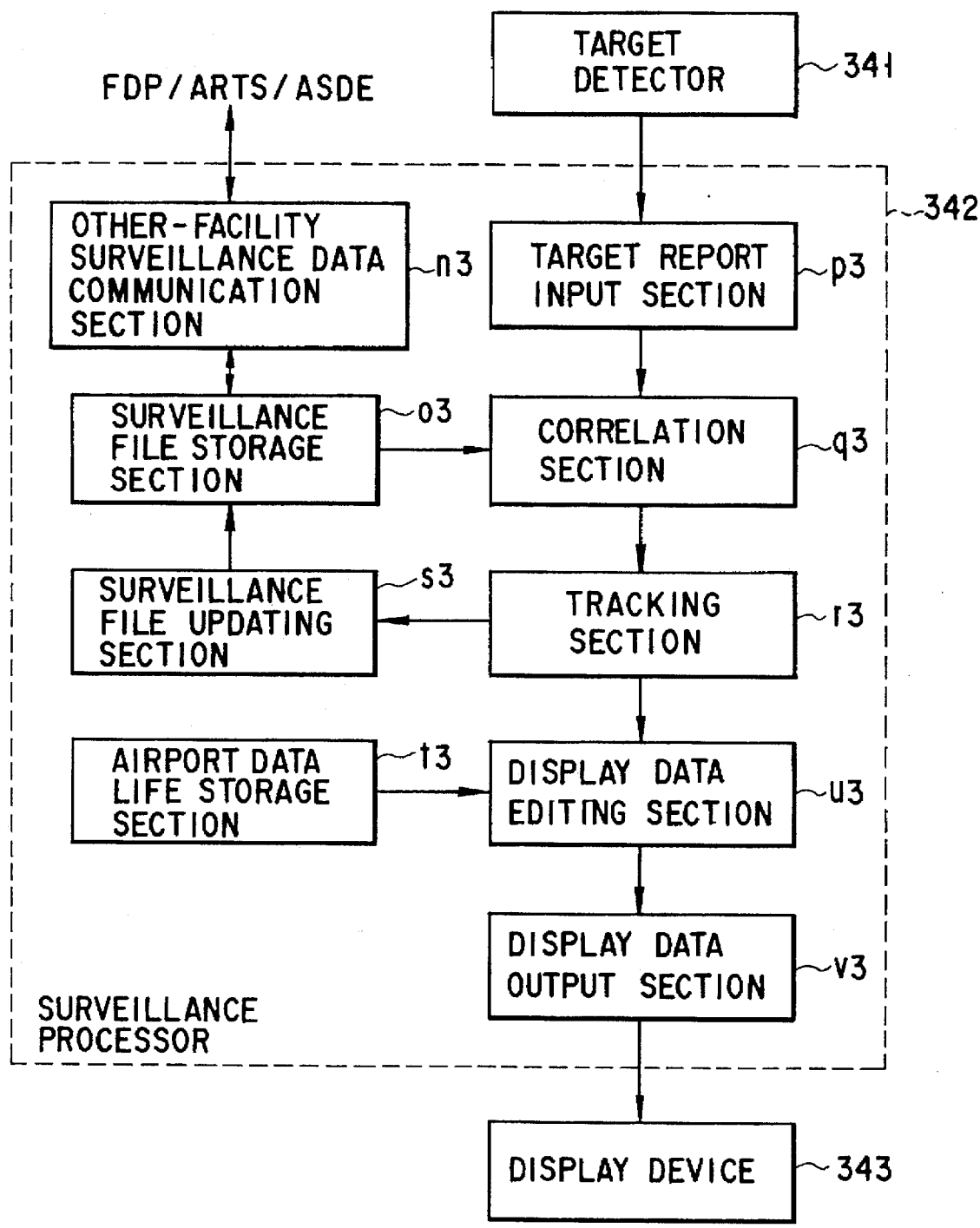
FIG. 22 is a block diagram showing the specific structure of a surveillance processor of the fifth embodiment.

The surveillance processor 342 has the specific structure as illustrated in FIG. 22.

The surveillance processor 342 communicates with another facility, such as an FDP (Flight Data Processing), ARTS (Automated Radar Terminal System) or ASDE (Airport Surface Detection Equipment) via an other-facility surveillance data communication section n3 to collect other-facility surveillance data, sends this data to a surveillance file storage section o3 to be stored in a surveillance file.

Upon reception of the target report, prepared by the target detector 341, via a target report input section p3, a correlation section q3 performs correlation of the surveillance file with each target report to discriminate and specify type data (aircraft identification code (call sign), vehicle number, or the like) of a control target 1 corresponding to the SSR code. Further, a tracking section r3 tracks the control target based on the result of each correlation process, and the surveillance file is updated by a surveillance file updating section s3 based on the tracking result.

Stored previously in an airport data file storage section t3 is the map data of the airport surface. After the tracking process, a display data editing section u3 edits the map data stored in the airport data file storage section t3, the positioning data corresponding to each time slot number in the target report, and the type data obtained by the correlation section q3 to prepare display data in a predetermined format. This display data is sent via a display data output section v3 to the display device 343.

The display device 343, located in the control room or associated sections, displays the display data from the surveillance processor 342 on, for example, a PPI to present the controller or the like with the data.

Figure 25:
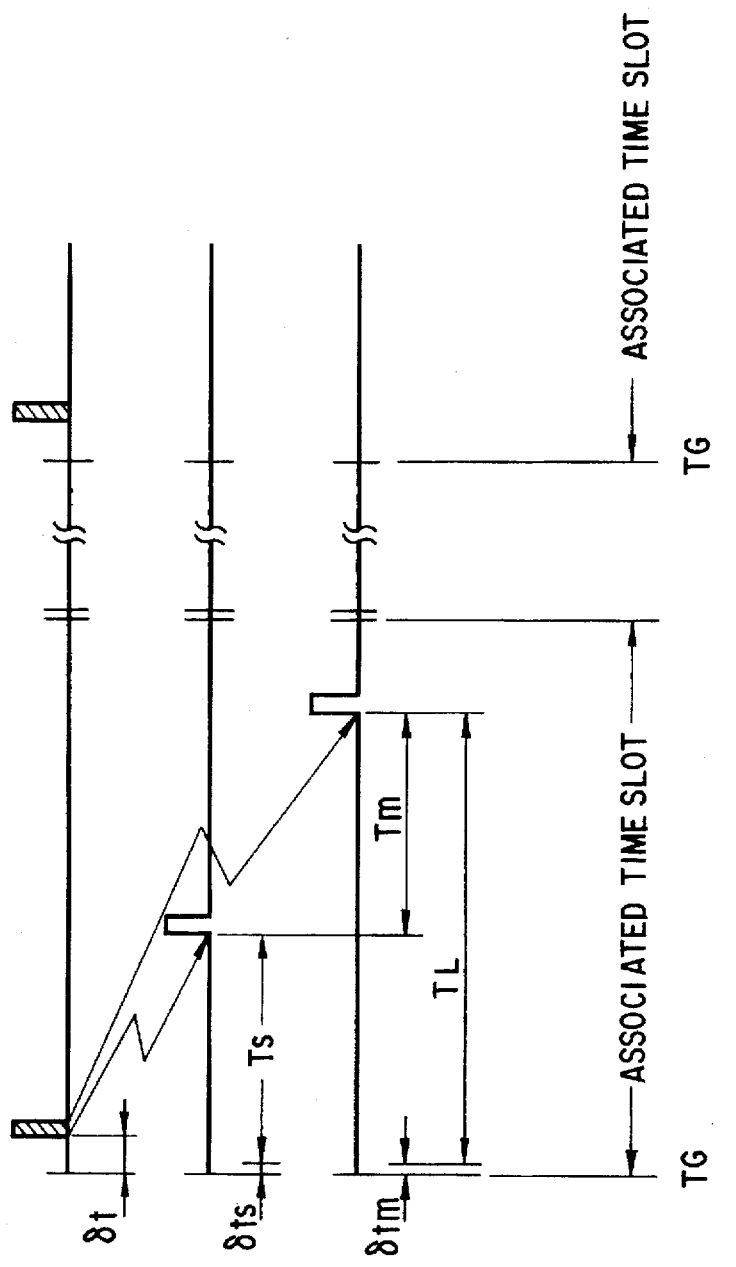
FIGS. 25A to 25C are a diagram illustrating the relation between transmission and reception timings of a pulse signal for explaining a positioning error in the fifth embodiment.

The operation of the system with the above-described structure will be described specifically with reference to FIGS. 23 through 25.

First, to monitor the position of a control target, the surveillance cycle should be set within at least about 1 second. The SSR code generator in a transponder mounted on an existing airplane can set a 4-digit numeral (0001 to 7777), each digit being any of 0 to 7. If this SSR code generator is used for the SSR code generator 1113 that is mounted on each control target 1, different ID codes can be assigned to 4096 control targets.

According to the system of this embodiment, therefore, airplanes given SSR codes are assigned with those SSR codes as ID codes, while other vehicles or the like are assigned with SSR codes assigned to an airport in such a way as not to overlap one another.

Figure 23:
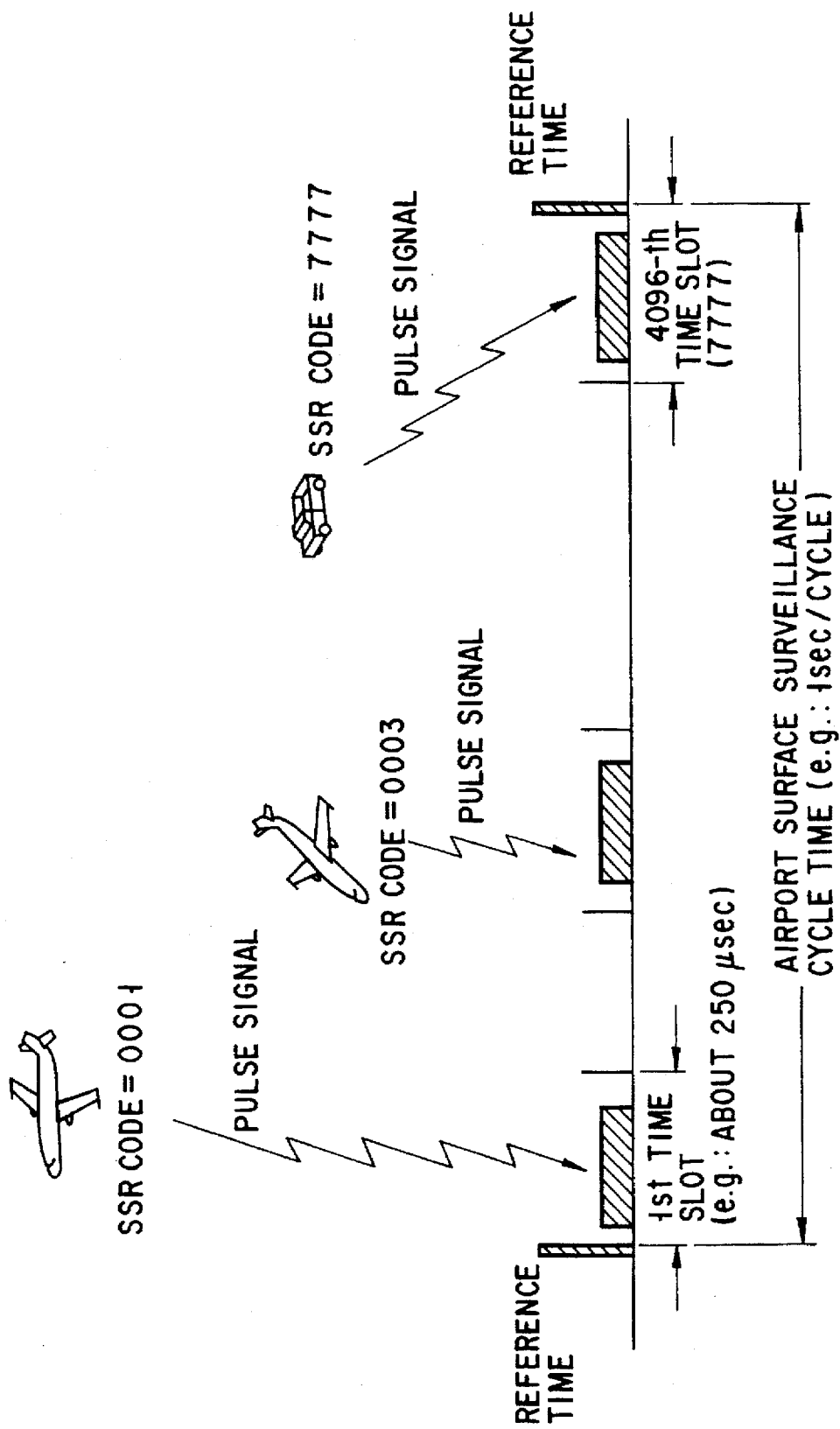
FIG. 23 is a diagram for explaining the relation between time slots and SSR codes in an airport-surface surveillance cycle according to the fifth embodiment.

As shown in FIG. 23, the airport surface surveillance cycle is set to 1 (sec/cycle) and is time-divided to 4096 time slots (one time slot=244.14≈250 µs) from the first time slot to the 4096-th time slot, with the GPS time as a reference, and the divided time slots are matched with the SSR code numbers, and a pulse signal of a predetermined frequency is sent to each control target 1 at the start timing of the time slot corresponding to the associated SSR code number.

In the example in FIG. 23, the airplane given the SSR code of "0001" sends a pulse signal in the period of the first time slot, the airplane given the SSR code of "0003" sends a pulse signal in the period of the third time slot, and the vehicle given the SSR code of "7777" sends a pulse signal in the period of the 4096-th time slot. Therefore, radiowaves sent from a plurality of control targets do not overlap one another in the same airport surface.

Next, the slave stations 5 and 6 and the master station 33 measures the times from the start timing of each time slot to the point of reception of the pulse signal from the control target 1 having the associated SSR code. At this time, it is necessary to make the start timing of the time slot for the control target 1 completely coincide with those for the individual stations 5, 6 and 33. For this purpose, the GPS time managed by the GPS satellite 4 is used to be matched with the times managed at the individual stations 5, 6 and 33, and each second is time-divided by 4096 to determine the time slot.

The slave stations 5 and 6 and the master station 33 use counters to measure the time. Those stations 5, 6 and 33 start the counters at the start timing of each time slot (every second of the GPS time), stops the counters at the pulse reception timing, and converts the count values to times to thereby measure the pulse transmission time from the control target 1. The time information measured by the slave stations 5 and 6 are collected in the master station 33 and is used in calculating the position of the control target 1 which has sent the pulse.

The fundamental concept of the position calculating process will now be described with reference to FIG. 24.

In FIG. 24, "S1" is the first slave station 5, "S2" is the second slave station 6, and "M" is the master station 33.

Suppose that the control target 1 has sent a pulse signal and the measured times at S1, S2 and M are Ts1, Ts2 and Tm respectively. With regard to the time difference Tm−Ts1 (=TLa) between the positions of S1 and M, the locus at the position where the time difference between S1 and M becomes TLa is a hyperbola A. Likewise, regarding the time difference Tm−Ts2 (=TLb) between the positions of S2 and M, the locus at the position where the time difference between S2 and M becomes TLb is a hyperbola B.

It is apparent from the diagram that the intersection between the hyperbolas A and B is equivalent to the position of the control target 1. As the positions of the slave stations S1 and S2 and the master station M are known and the speed of the pulse transmission wave is equal to the light speed C, the function of the hyperbolas A and B and the position of the intersection of the hyperbolas can be calculated. Given that the light speed is C, the line of positions of the hyperbolas A and B, LOPa and LOPb, are expressed as follows.

LOPa=TLa×C

LOPb=TLb×C

Actually, it is difficult to synchronize the times at the control target 1, the slave stations 5 and 6 and the master station 33 completely with the GPS time and slight errors occur between the pulse signal transmission times and the count start timings. Those slight errors are the measuring precision of the present system. FIGS. 25A through 25C illustrate the relation between the transmission and reception timings of the pulse signal.

Suppose that TG is the start timing of the time slot managed at the GPS time, the pulse transmission timing for the control target 1 has been delayed from TG by $\delta t$ as shown in FIG. 25A, the count start timing for the slave stations has been delayed from TG by $\delta ts$ as shown in FIG. 25B, and the count start timing for the master station has been delayed from TG by $\delta tm$ as shown in FIG. 25C.

In this case, given that the measured time at the slave stations is Ts1 and the measured time at the master station is Tm, the time difference between both measured times TL becomes TL=(Tm−Ts)+($\delta$ tm−ts)

where ($\delta$ tm−$\delta$ ts) is the deterioration of the precision..

It should be noted here that the LOP error or the positioning error does not involve an error in the pulse transmission time of the control target (or the GPS time error) $\delta t$. The LOP error is ($\delta t$−$\delta ts$) whose terms take disperse values, so that the accurate LOP error becomes {($\delta$ tm)$^2$+($\delta$ ts)$^2$}$^{1/2}$ In any case, the time measuring errors at the master station and the slave stations can be reduced to the negligible levels with respect to the positioning precision by the technique, such as the GPS common view.

The positioning data of the control target obtained through the above-described processing is sent together with the information of the GPS time and the pulse reception time to the surveillance subsystem 34. The surveillance subsystem 34 discriminate the associated time slot number from the pulse reception time, finds the SSR code corresponding to that number, and edits the target report. Further, the surveillance subsystem 34 discriminates a type through the correlation of the target report with the surveillance file, prepares display data having the positioning data, type data and airport surface map data associated with one another after the tracking process, and provides the controller or the like the display data.

According to the control target surveillance system with the above-described structure, therefore, the positioning data of multiple control targets in the airport surface can be obtained at high precision via fewer communications lines and in a short period of time. Further, as the SSR code generator already mounted on an airplane is used, less burden will be put on control targets and considerable cost reduction will be expected in building this system.

Particularly, nothing should be sent to the control target from the control equipment and the control target should simply send a pulse signal to the control equipment. It is therefore possible to set the surveillance cycle to a relatively short period of time and collect and display positioning information of many control targets.

Further, since the surveillance system with the above structure treats the GPS time as a reference, it can easily and accurately match the times managed by all control targets with those managed by the control equipment. This can ensure the accurate assignment of time slots.

The use of the LORAN system allows the master station to obtain highly accurate positioning data (in nearly the 1-m order), so that the control equipment simply needs to receive the pulse signal from each control target to accomplish a highly accurate mapping display, which can sufficiently be used for the surveillance of the individual control targets.

Further, since this surveillance system has only to use one frequency for the transmission of the pulse signal, this system is very effective in the case where the frequency allocation is difficult. While the communications line from the slave station to the master station is desirably a high-speed communications equipment such as an optical communications equipment, the existing communications line can sufficiently serve the purpose if a delay time for signal transmission through this line is considered previously.

Figure 26:
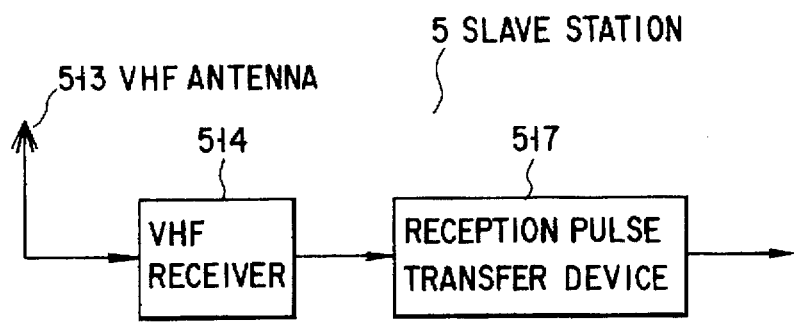
FIG. 26 is a block diagram showing the specific structure of a slave station of a sixth embodiment.
Figure 27:
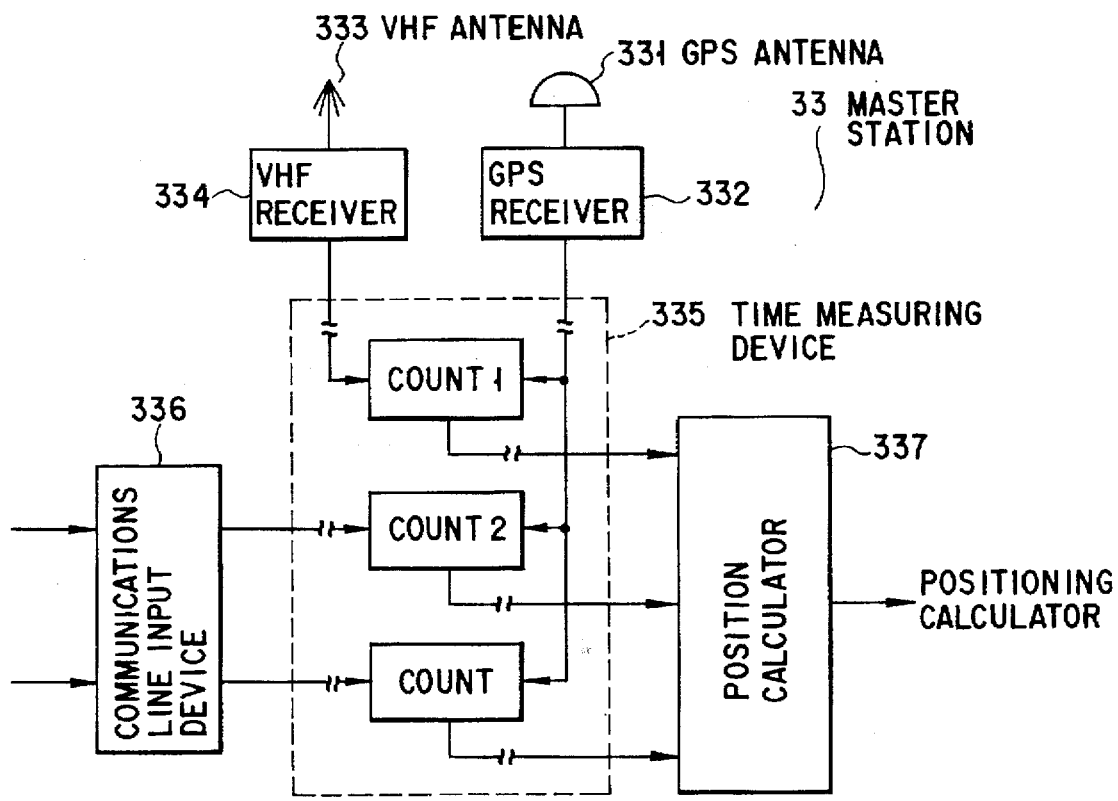
FIG. 27 is a block diagram showing the specific structure of a master station of the sixth embodiment.

Although the first and second slave stations measure the times for the pulse transmission and reception in the above embodiment, those times may be measured on the master station side. This modification simplifies the system and is thus more advantageous. The structure of the first slave station 5 (which is the same as that of the second slave station 6) and the structure of the master station 33 in this case are illustrated in FIGS. 26 and 27. This modified system will be described below as a sixth embodiment. In FIGS. 26 and 27, like or same reference symbols as used in FIGS. 17 and 18 are also used to denote corresponding or identical parts to avoid repeating their descriptions.

FIG. 26 shows the structure of the first slave station 5. The slave station 5 comprises a VHF antenna 513, a VHF receiver 514, and a reception pulse transfer device 517. When the VHF receiver 514 receives the pulse signal, sent from the control target 1, via the VHF antenna 513, this pulse signal is sent via a predetermined communications line to the master station 33 by the transfer device 517. The second slave station 6 has the same structure.

FIG. 27 specifically shows the structure of a master station 33, particularly, the structure of a time measuring device 335. This time measuring device 335 has first to third counters COUNT1 to COUNT3. The time measuring device 335 causes all the counters COUNT1–COUNT3 to start counting at the same time at the start timing of each time slot detected from the GPS time, stops the first counter COUNT1 at the timing of pulse reception at the master station 33, stops the second and third counters COUNT2 and COUNT3 at the timings of detection of the pulse signals sent from the first and second slave stations 5 and 6. Accordingly, the pulse transmission time at the master station 33 can be measured by the first counter, while the pulse transmission times at the individual slave stations can be measured by the second and third counters. The subsequent processing is the same as that of the first embodiment.

With the above structure, the individual slave stations 5 and 6 need not manage the times, but the machine-oriented delay from the pulse reception to the pulse transmission and the transfer delays from the slave stations 5 and 6 to the master station 33 should be considered. FIGS. 28A through 28D illustrate the relation between the transmission and reception timings of the pulse signal, which will be referred to in the following description.

Figure 28:
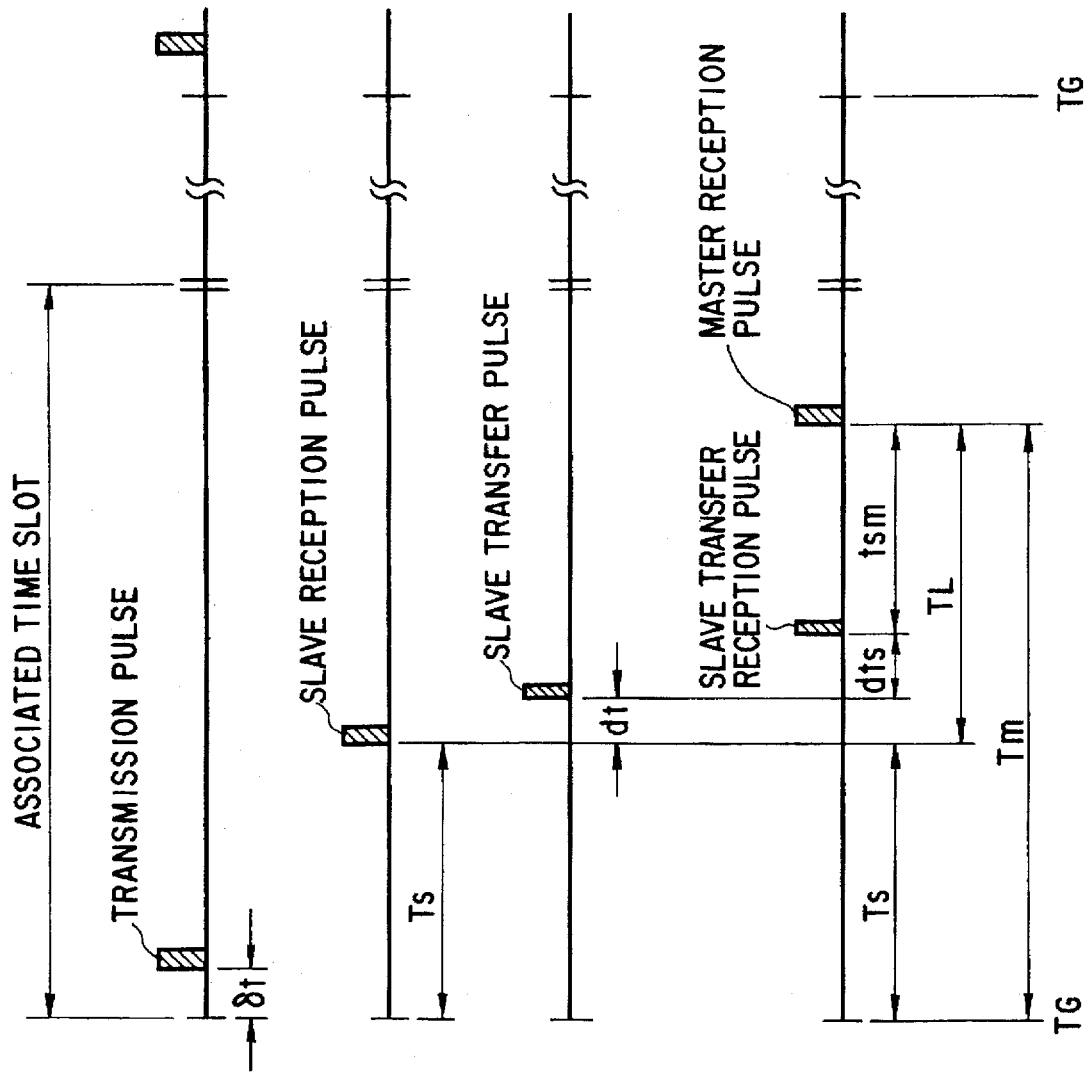
FIGS. 28A to 28D are a diagram illustrating the relation between transmission and reception timings of a pulse signal for explaining a positioning error in the sixth embodiment.

Suppose that TG is the start timing of the time slot managed at the GPS time, the pulse transmission timing for the control target 1 has been delayed from TG by δt as shown in FIG. 28A, the pulse signal has been received at the slave station with a delay of Ts from TG as shown in FIG. 28B, and the pulse signal has been transferred after time dt as shown in FIG. 28C and has been received at the master station after the passage of time dts from dt as shown in FIG. 28D. Also suppose that the master station has received the pulse signal directly after the passage of time TM from TG as shown in FIG. 28D.

In this case, the time measured by the counter in the master station is Tm−(Ts+dt+dts). Therefore, the time difference TL between the reception time at the slave station and the reception time at the master station with respect to the same pulse signal becomes $$TL = Tm - Ts$$
$$= tsm + dt + dts$$

The machine-oriented delay time dt and transfer delay time dts at each slave station can be measured previously.

If the machine-oriented delay time and transfer delay time at each slave station 5 or 6 are measured previously and the master station 33 is designed to cancel those delays, the accurate information on the time difference between the slave and master can be obtained.

Unlike the fifth embodiment, this structure need not require the time management on the slave station side, so that the structure of the slave station can be simplified, and measures the times all on the master station side, so that the time slot error need not be considered, thus providing more accurate positioning data.

Although there are two slave stations in the above-described embodiments, more slave stations may be arranged depending on the surveillance area, the positions of buildings and the like. In this case, the individual processes can be accomplished in the same way as those in the above embodiments.

Although the foregoing description has been given of the surveillance of the positions of airplanes and vehicles in the airport surface, the present invention is not limited to this case, but may be adapted for the surveillance of the positions of ships in a seaport, the surveillance of the positions of tanks or the like in a firing sector and so forth. This invention may of course be embodied in many other specific forms without departing from the spirit or scope of the invention.

Figure 29:
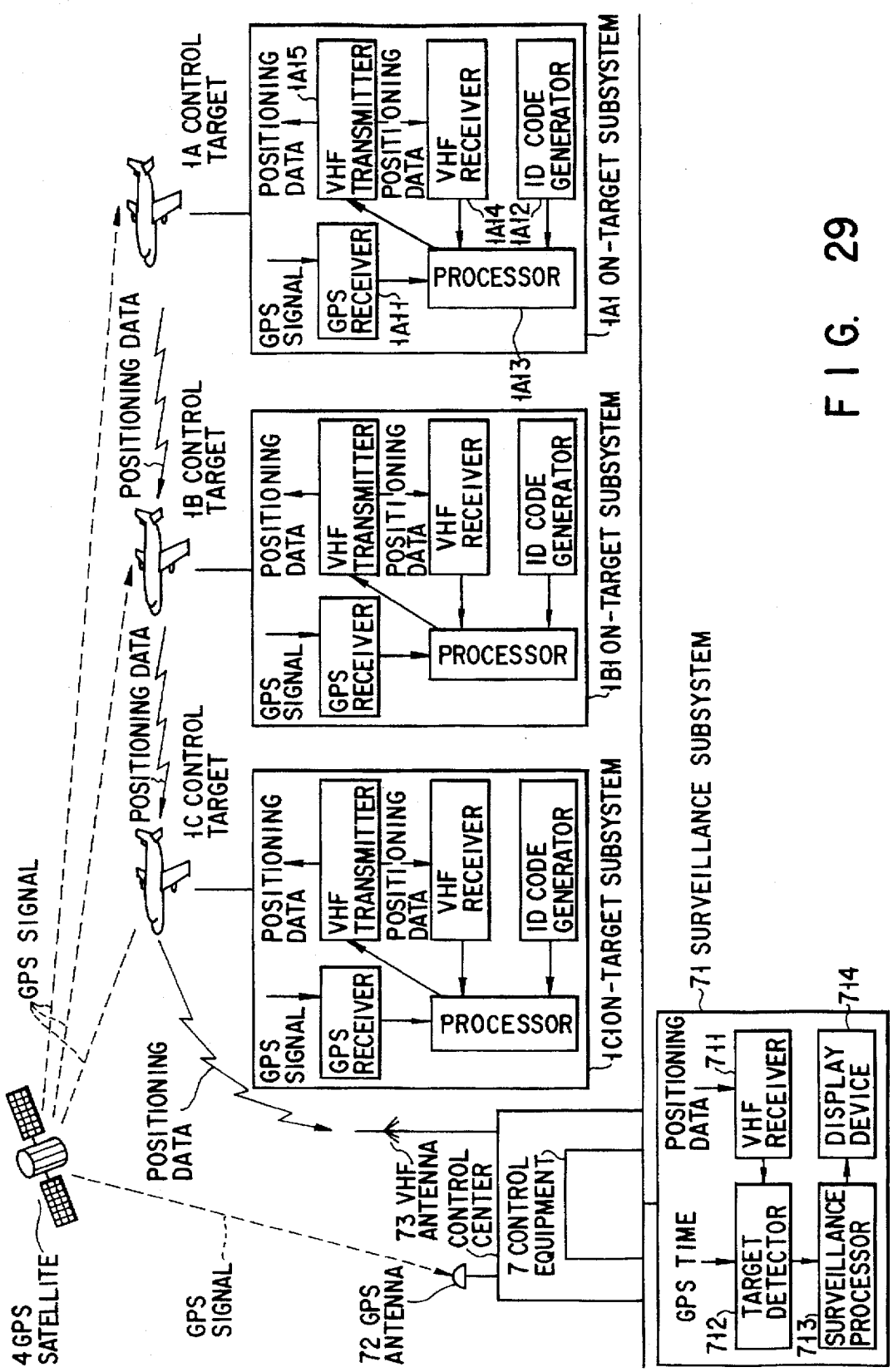
FIG. 29 is a diagram showing the structure of a control target surveillance system according to a seventh embodiment of the present invention.

FIG. 29 illustrates a control target surveillance system according to a seventh embodiment of this invention. FIG. 29 shows the structure of the system that monitors airplanes and vehicles flying over an ocean as control targets. In FIG. 29, like or same reference symbols as used in FIG. 1 are also used to denote corresponding or identical parts.

Referring to FIG. 29, control targets 1A and 1B are flying over an ocean line and cannot directly communicate with the control equipment, while a control target 1C is positioned to be capable of communicating directly with the control equipment. Reference numeral "4" is a GPS satellite as a navigation satellite (although three or more GPS satellites are needed to actually obtain positional data, only one is illustrated for descriptive simplification), and reference numeral "7" is the control equipment in the control center.

The control targets 1A, 1B and 1C have on-target subsystems 1A1, 1B1 and 1C1 mounted thereon, respectively. Since those subsystems 1A1, 1B1 and 1C1 have the same structure, only the structure of the subsystem 1A1 will be explained below.

This subsystem 1A1 has a GPS receiver 1A11 to receive a GPS signal from the GPS satellite 4 to thereby acquire a GPS time and local positional data (hereinafter called "positioning data"). This subsystem 1A1 further includes an ID code generator 1A12, a processor 1A13, a VHF receiver 1A14 and a VHF transmitter 1A15 (including a VHF antenna).

The ID code generator 1A12 is an SSR code generator incorporated in a transponder, which is installed on an airplane, and uses SSR codes directly.

The processor 1A13 edits the positioning data, acquired by the GPS receiver 1A11, in a predetermined format, determines the communication destination for the local positional information based on the positional information of another control target flying nearby, input through the VHF receiver 1A14 (in the case of the control target 1A, the destination is the control target 1B in FIG. 29), and manages the transmission time for the edited data based on the ID code from the ID code generator 1A12 with the GPS time as a reference.

The VHF transmitter 1A15 transmits the positioning data, edited by the processor 1A13, to another control target or control equipment (which is the control target 1B in the case of the control target 1A in FIG. 29) in the associated time slot.

The control equipment 7 is provided with a surveillance subsystem 71, a GPS antenna 72, and a VHF antenna 73. The surveillance subsystem 71 has a VHF receiver 711, a target detector 712, a surveillance processor 713 and a display device 714.

The VHF receiver 711 receives positioning data from each control target (1A in the diagram) received at the VHF antenna 73.

The target detector 712 manages times based on the GPS time obtained at the GPS antenna 72, receives positioning data obtained by the VHF receiver 711 to obtain the reception time, discriminates the ID code of the data sender (control target) from the reception time, edits a target report associating the ID code with the reception time for the positional data, and outputs the target report to the surveillance processor 713.

The surveillance processor 713 communicates with another facility, such as an FDP (Flight Data Processing), ARTS (Automated Radar Terminal System) or RDP (Radar Data Processing) via an interface (not shown) to collect data files for surveillance, and prepares and registers a surveillance file.

The surveillance processor 713 receives the target report, prepared by the target detector 712, performs correlation of the surveillance file with the target report to discriminate and specify the aircraft identification code of the control target associated with the ID code, and updates the surveillance file based on the result of each correlation. The aircraft ID code and positioning data of all the control targets, thus obtained, are edited in a predetermined format to prepare display data, and the display data is output to the display device 714.

The display device 714, located in the control room or associated sections, displays the display data from the surveillance processor 713 on, for example, a PPI to present the controller or the like with the data.

The operation of the system with the above-described structure will be described specifically.

First, to monitor the position of a control target, a cycle of acquiring its positioning data should be set within at least about 4 seconds (if this cycle should be set equal to the surveillance cycle of the air-route surveillance radar). The SSR code generator in a transponder mounted on an airplane can set a 4-digit numeral (0001 to 7777), each digit being any of 0 to 7. If this SSR code generator is used for the ID code generator that is mounted on each control target, different ID codes can be assigned to 4096 control targets.

In the present embodiment, if the flight distance between airplanes which relay data is 200 NM, the time needed for propagation of electric waves therebetween is about 1 ms. The time in each time slot remains as a dead time which cannot be used for data transmission. Thus, the time slot width assigned to each airplane must be supposed to be longer than 1 ms.

For example, if the monitor cycle is 1 second, the time necessary for transmitting 90-bit data by electric waves in a band of 25 kHz is about 2.9 ms in the state of the art. Thus, by setting the time slot width at 3.9 ms, 256 airplanes can be controlled per second by a single electric wave.

From the above, 16 waves are needed to monitor 4096 airplanes in a monitor cycle of 1 second. In addition, if the monitor cycle is 4 seconds, 4 waves are needed to monitor 4096 airplanes.

In the present embodiment, 4096 airplanes are monitored in the monitor cycle of 1 second. Of the 12 bits of the SSR code, the upper 4 bits are used to divide the objects to be controlled into 16 groups, and one wave is assigned to each group. In each group, 256 time slots formed by dividing one second are assigned as positioning data transmission periods to the lower 8 bits of the identification code from the lowest bit.

According to the system of this embodiment, SSR codes are assigned as ID codes of airplanes, the surveillance cycle is set to 3 (sec/cycle) and is time-divided to 4096 time slots (one time slot=73.2≈0.75 ms) with the GPS time as a reference, and the divided first time slot to the 4096-th time slot are assigned to the transmission periods of positioning data of control targets in the order of younger ID codes.

More specifically, the airplane given the ID code (SSR code) of "0001" sends its positioning data in the period of the first time slot, and the airplane given the ID code of "1111" sends its positioning data in the period of the 1111-st time slot.

The above assignment of time slots eliminates the need for any exchange of the ID code between control targets (including the sender and an airplane that relays the data) and the control equipment. It is also unnecessary to adjust the transmission time between the control targets and the control equipment.

Since the surveillance system with the above structure treats the GPS time as a reference, it can easily and accurately match the times managed by all control targets with those managed by the control equipment. This can ensure the accurate assignment of time slots.

The relay method will now be described with reference to FIG. 30.

The control target 1A can find out that the control target 1B is requesting the relay of the positioning data of the control target 1B to the control target 1C by monitoring the transmission of the control target 1B via the local VHF receiver, and can also find out that the control target 1B is flying closer to the control equipment 7 than the control target 1A (step a4). Thus, the control target 1A determines the control target 1B as the one which the control target 1A asks to relay the local positioning data.

Figure 30:
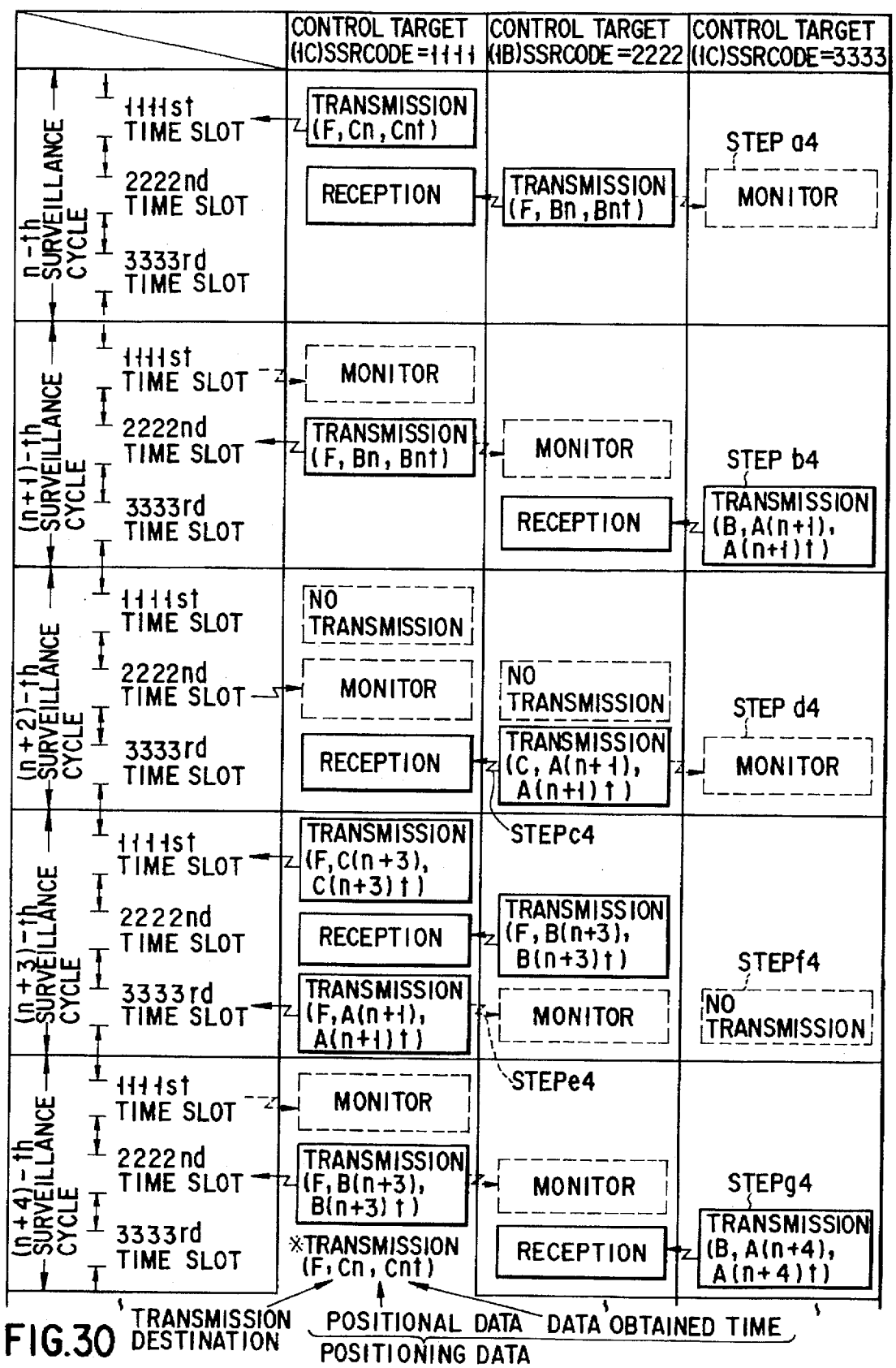
FIG. 30 is a diagram illustrating how a control target relays positional information according to the seventh embodiment.

In the time slot associated with its own SSR code (the 3333-rd time slot in FIG. 30) in the next surveillance cycle (the (n+1)-th surveillance cycle in FIG. 30), the control target 1A sends the positioning data (An+1) then to the control target 1B (step b4).

The control target 1B receives that positioning data from the control target 1A in the (n+1)-th surveillance cycle and relays it to the control target 1C in the next (n+n)-th surveillance cycle. Used as the transmission time slot at this time is the 3333-rd time slot assigned to the control target 1A which is the original sender (step c4).

In the (n+2)-th surveillance cycle, the control target 1A monitors that the control target 1B has relayed the positioning data of the control target 1A to the control target 1C (step d4).

In the (n+3)-th surveillance cycle, the control target 1C further relays the positioning data of the control target 1A to another control target or the control equipment 7, while the control target 1B monitors that the control target 1C has received the positioning data of the control target 1A it has relayed, and has relayed the data to another one (step e4). In this surveillance cycle, the control target 1A does not send its positioning data to the control target 1B so as not to interfere with the control target 1B monitoring the data relay (step f4).

In the (n+4)-th surveillance cycle, the control target 1A sends the positioning data to the control target 1B in the same manner as done in the (n+1) surveillance cycle.

As described above, three operations, namely the transmission of positioning data, the monitoring of the transmission destination relaying the positioning data to a next relay point and no transmission/reception (rest), are executed in three surveillance cycles, and the operational sequence is repeated to accomplish the relay of the positioning data.

Specifically, in the present embodiment, since positional data updated in every third monitor cycle is sent to the control equipment 4, data is updated in the control equipment 4 once in every three seconds. The rate of updating is higher than that in the current RDP in which data is updated once in every 10 seconds. Thus, the accuracy of the RDP system can be enhanced by coupling the present system to the RDP.

The above-described relaying permits the control equipment 7 to acquire the positioning data of the control targets 1A, 1B and 1C via the control target 1C. The control equipment 7 uses the GPS time to manage the time slots in the same way as the control targets 1A, 1B and 1C. Every given surveillance cycles, the present surveillance system receives the positioning data from the control target 1C via the VHF line, discriminates the associated ID code from the time slot in which the reception event has occurred, grasping the sender control target of each positioning data, and displays the position of each control target based on the positioning data, acquired every given surveillance cycles, and its sender control target.

As the positioning data includes the acquired time information at this time, the current position of the control target having sent the received positioning data is predicted by referring to the flight plan of the sender control target and the predicted current position is displayed, thus facilitating the surveillance of the positions of the individual control targets 1A, 1B and 1C at the current time.

According to the control target surveillance system with the above structure, therefore, the positional data of many control targets over an ocean can be acquired at high precision in a short period of time using a single line of the VHF band. Further, it is unnecessary to install a satellite communications line in each control target, so that the burden on the control target is reduced.

Figure 31:
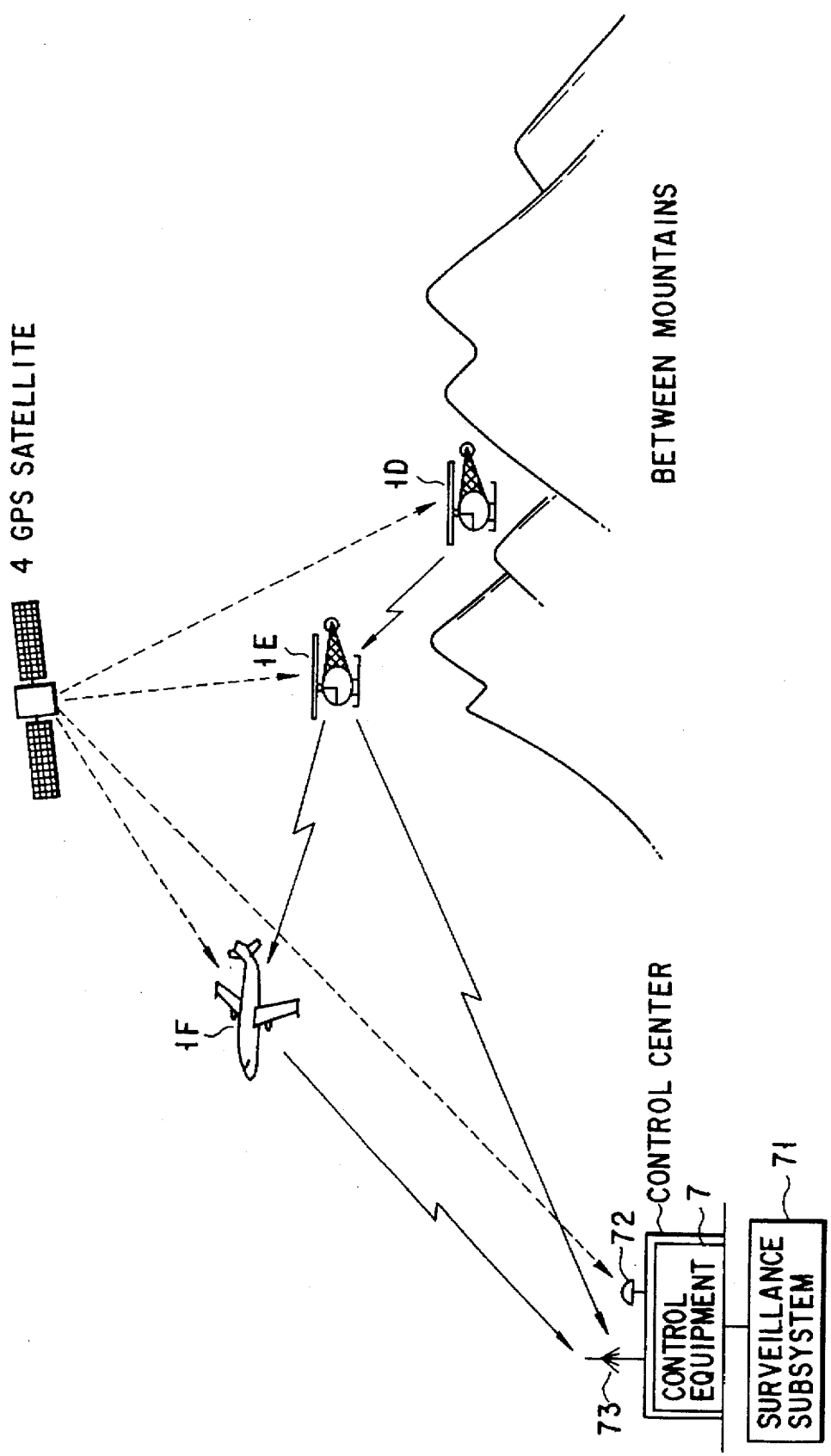
FIG. 31 is a diagram showing the structure of a control target surveillance system according to an eighth embodiment of the present invention.

FIG. 31 illustrates an eighth embodiment of this invention, which surveys a search and rescue aircraft flying between mountains. In FIG. 31, like or same reference symbols as used in FIG. 29 are also used to denote corresponding or identical parts to avoid repeating their descriptions.

A control target (search and rescue aircraft) 1D flying between mountains often flies off the radar range. In this respect, a control target 1E is positioned above between mountains, so that the positioning data of the control target 1D is relayed via the control target 1E above to a control target 1F in a regular air route before reaching the control equipment 7, or is relayed via the control target 1E directly to the control equipment 7. The structure of this embodiment can held building an effective surveillance system for search and rescue aircrafts.

This invention is not limited to any of the above-described embodiments, but may be embodied in many other specific forms without departing from the spirit or scope of the invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A control target surveillance system for allowing a control equipment to monitor positions of a plurality of control targets in a control zone, said system comprising:

time adjusting means for making times, managed by said plurality of control targets and said control equipment, coincide with one another;

positional data obtaining means, installed on each of said control targets, for obtaining at least local positional data using a satellite navigation system;

positional data transmitting means, installed on each of said control targets and being managed with times adjusted by said time adjusting means, for transmitting said positional data, obtained by said positional data obtaining means, to said control equipment via a specific communications line within a period of a time slot corresponding to an identification code previously affixed;

positional data receiving means, provided at said control equipment, for receiving positional data sent from each control target via said communications line;

control target discriminating means, provided at said control equipment and being managed with times adjusted by said time adjusting means, for, with regard to each positional data received at said positional data receiving means, obtaining a corresponding identification code from a time slot of a reception time of said positional data to thereby discriminate the control target which has sent said positional data; and display means, provided at said control equipment, for displaying positions based on said received data and a result of said control target discrimination every given surveillance cycle, whereby said surveillance cycle is time-divided by at least a plurality of previously prepared identification codes to determine time slots corresponding to said identification codes, and said identification codes are previously given to said plurality of control targets in such a way as not to overlap one another to thereby assign said time slots to said control targets.

2. The control target surveillance system according to claim 1, wherein said time adjusting means performs time adjustment based on times managed by a navigation satellite used by said satellite navigation system.

3. The control target surveillance system according to claim 1, further comprising a ground station having differential data generating means for obtaining positional data at a known position in said control zone based on satellite information from a same navigation satellite as used by said satellite navigation system of said control target and comparing said positional data with known positional data to calculate differential data, and differential data transmitting means for transmitting said differential data obtained by said differential data generating means to said plurality of control targets; and wherein said plurality of control targets are each equipped with differential data receiving means for receiving said differential data; and said position data obtaining means has a function for compensating positional data obtained using said satellite navigation system, based on said differential data.

4. The control target surveillance system according to claim 3, wherein said differential data transmitting means of said ground station transmits differential data via a line which permits said satellite navigation system installed in each of said plurality of control targets to receive data.

5. The control target surveillance system according to claim 3, wherein said differential data transmitting means time-divides said surveillance cycle by a number equal to or greater than a number of identification codes to secure a time slot for transmission of differential data and transmits differential data via a communications line for communication of said positional data in a period of said time slot.

6. The control target surveillance system according to claim 1, further comprising a ground station having differential data generating means for obtaining positional data at a known position in said control zone based on satellite information from a same navigation satellite as used by said satellite navigation system of said control target and comparing said positional data with known positional data to calculate differential data;

said control target discriminating means of said control equipment has a function for compensating positional data of a control target received by said position data receiving means, based on said differential data obtained by said differential data generating means.

7. A control target surveillance system for allowing a control equipment to monitor positions of a plurality of control targets in a control zone, said system comprising:

time adjusting means for making times, managed by said plurality of control targets and said control equipment, coincide with one another;

positional data obtaining means, installed on each of said control targets, for obtaining at least local positional data using a satellite navigation system;

time slot discriminating means which is given a grid data file showing a correlation between positions of grid points in a coordinate system, obtained by previously segmenting said control zone in a mesh form in an arbitrary pattern, and time slots, and refers to said grid data file to obtain a time slot of a grid point corresponding to said positional data;

identification code transmitting means, being managed with times adjusted by said time adjusting means, for transmitting previously given identification codes to said control equipment via a specific communications line within a period of said time slot obtained by said time slot discriminating means;

identification code receiving means, provided at said control equipment, for receiving an identification code sent from each control target via said communications line;

control target discriminating means, provided at said control equipment, for discriminating of a type of a sender control target;

positional data discriminating means for obtaining, from a time slot corresponding to a reception time of said received identification code, a position of an associated grid point in said coordinate system, and outputting said position as positional data of said control target whose type has been discriminated; and display means, provided at said control equipment, for displaying positions based on said received data and a result of said control target discrimination every given surveillance cycle, whereby each grid point in said coordinate system is expressed by a first axis and a second axis, said surveillance cycle is time-divided to at least first and second transmission stages, said first transmission stage is time-divided by a number of first axis grid points in said coordinate system so as to associate individual time slots with said first axis grid points, said second transmission stage is time-divided by a number of second axis grid points in said coordinate system so as to associate individual time slots with said second axis grid points, identification codes are given to said plurality of control targets in a non-overlapping manner, and each identification code is transmitted in a time slot corresponding to associated first axis and second axis grid points.

8. The control target surveillance system according to claim 7, wherein said time adjusting means performs time adjustment based on times managed by a navigation satellite used by said satellite navigation system.

9. The control target surveillance system according to claim 7, further comprising a ground station having differential data generating means for performing a positioning operation at a known position in said control zone based on satellite information from a same navigation satellite as used by said satellite navigation system of said control target and comparing said positional data with known positional data to calculate differential data, and differential data transmitting means for transmitting said differential data obtained by said differential data generating means to said plurality of control targets; and wherein said plurality of control targets are each equipped with differential data receiving means for receiving said differential data; and said position data obtaining means has a function for compensating positional data based on said differential data.

10. The control target surveillance system according to claim 9, wherein said differential data transmitting means secures a time slot for transmission of differential data in said surveillance cycle and transmits differential data via a communications line for communication of said positional data in a period of said time slot.

11. The control target surveillance system according to claim 9, wherein said differential data transmitting means of said ground station transmits differential data via a line which permits said satellite navigation system installed in each of said plurality of control targets to receive data.

12. The control target surveillance system according to claim 7, wherein said grid points in said coordinate system are arranged densely in a portion where concentration of control targets is expected and are arranged sparsely in other portions.

13. The control target surveillance system according to claim 7, wherein SSR codes are used as said identification codes.

14. The control target surveillance system according to claim 7, wherein Mode-S addresses are used as said identification codes.

15. A control target surveillance system for allowing a control equipment to monitor positions of a plurality of control targets in a control zone, giving one of a plurality of previously prepared identification codes for all of said plurality of control targets, time-dividing a surveillance cycle by at least a number of said identification codes while managing said surveillance cycle with a reference time and assigning said plurality of identification codes to mutually different time slots, said system comprising:

on-target subsystems, installed on said control targets, and each having time managing means for acquiring information of said reference time to manage a time based on said reference time, and pulse signal transmitting means for discriminating a start timing of a time slot to which a local identification code is assigned, from said time managed based on said reference time, and sending a pulse signal of a predetermined frequency at said start timing;

a plurality of slave stations, located at different known positions in said control zone, and having pulse signal receiving means for receiving pulse signals sent from said plurality of control targets, time managing means for acquiring said information of said reference time to manage a time based on said reference time, time measuring means for measuring a time from said start timing of each time slot to a reception timing of said pulse signal and measured time outputting means for outputting a measured time, obtained by said time measuring means, to said control equipment;

a master station, located at a known position different from those of said plurality of slave stations in said control zone, and having pulse signal receiving means for receiving pulse signals sent from said plurality of control targets, time managing means for acquiring said information of said reference time to manage a time based on said reference time, time measuring means for measuring a time from said start timing of each time slot to a reception timing of said pulse signal and measured time inputting means for receiving measured time information from said plurality of slave stations, and position calculating means for obtaining a time difference between individual measured times from said plurality of slave stations and a local measured time, obtaining a hyperbolic function indicating a locus showing said time differences between said slave stations and calculating a position of an intersection of at least two hyperbolas; and a surveillance subsystem, provided in said control equipment, for obtaining a position of an intersection of hyperbolas obtained by said master station as positional information of a control target as a sender every said surveillance cycle, detecting an identification code from a time slot for which a reception event has occurred to find a type of an associated control target, and performing a display process.

16. The control target surveillance system according to claim 15, wherein said time measuring means of said plurality of slave stations and said master station start counters at start timings of respective time slots and stopping said counters at a pulse signal reception timing to measure times.

17. The control target surveillance system according to claim 15, wherein said time managing means provided in said on-target subsystems, said plurality of slave stations and said master station perform time adjustment based on times managed by a navigation satellite used by said satellite navigation system.

18. A control target surveillance system for allowing a control equipment to monitor positions of a plurality of control targets in a control zone, giving one of a plurality of previously prepared identification codes for all of said plurality of control targets, time-dividing a surveillance cycle by at least a number of said identification codes while managing said surveillance cycle with a reference time and assigning said plurality of identification codes to mutually different time slots, said system comprising:

on-target subsystems, installed on said control targets, and each having time managing means for acquiring information of said reference time to manage a time based on said reference time, and pulse signal transmitting means for discriminating a start timing of a time slot to which a local identification code is assigned, from said time managed based on said reference time, and sending a pulse signal of a predetermined frequency at said start timing;

a plurality of slave stations, located at different known positions in said control zone, and having pulse signal receiving means for receiving pulse signals sent from said plurality of control targets, and pulse signal transmitting means for immediately transmitting said pulse signal received by said pulse signal receiving means;

a master station, located at a known position different from those of said plurality of slave stations in said control zone, and having pulse signal receiving means for receiving pulse signals sent from said plurality of control targets, time managing means for acquiring said information of said reference time to manage a time based on said reference time, first time measuring means for measuring a time from said start timing of each time slot to a reception timing of said pulse signal, second time measuring means for measuring a time from said start timing of each time slot to an input timing of said pulse signal transferred from said plurality of slave stations, and calculating means for obtaining time differences between measured times obtained by said first time measuring means and measured times obtained by said second time measuring means for each slave station, obtaining a hyperbolic function indicating a locus showing said time differences between said slave stations and calculating a position of an intersection of at least two hyperbolas; and a surveillance subsystem, provided in said control equipment, for obtaining a position of an intersection of hyperbolas obtained by said master station as positional information of a control target as a sender every said surveillance cycle, detecting an identification code from a time slot for which a reception event has occurred to find a type of an associated control target, and performing a display process.

19. The control target surveillance system according to claim 18, wherein said first and second time measuring means of said master station start counters at start timings of respective time slots and obtaining count values of said counters at a reception timing for a local pulse signal and a reception timing for pulse signals transferred from said slave station, to thereby measure times.

20. The control target surveillance system according to claim 18, wherein said time managing means provided in said on-target subsystems and said master station perform time adjustment based on times managed by a navigation satellite used by said satellite navigation system.

21. The control target surveillance system according to claim 15 or 18, wherein said identification codes are SSR codes.

22. A control target surveillance system for allowing a control equipment to monitor positions of a plurality of control targets in a control zone, individual control targets mutually using a specific communications line to transmit local positioning data, and receiving and resending positioning data sent from other control targets, whereby positioning data of a plurality of control targets reach said control equipment.

23. The control target surveillance system according to claim 22, wherein time-divided time slots of a surveillance cycle associated in a non-overlapping manner with identification codes, previously given to all control targets in operation, are assigned to data transmission period of control targets having associated identification codes;

said plurality of control targets each have a function to obtain local positioning data, receive positioning data sent for each time slot from other control targets via a specific communications line and transmitting each positioning data in an assigned time slot via said communications line; and said control equipment has a function to receive positioning data for each time slot via said specific communications line, discriminate an identification code from said time slot and discriminate a control target having sent said received positioning data.

24. The control target surveillance system according to claim 22, wherein said plurality of control targets and said control equipment each have time adjusting means for matching times, managed by themselves, with one another.

25. The control target surveillance system according to claim 24, wherein said time adjusting means obtains managed time from a navigation satellite using a satellite navigation system and performs time adjustment based on said managed time.

26. The control target surveillance system according to claim 24, wherein said control target comprises:

time slot managing means for managing said time slots based on said time adjusted by said time adjusting means;

positioning data obtaining means for obtaining at lest local positioning data using said satellite navigation system;

positioning data receiving means for receiving positioning data for each time slot from other control targets via said communications line; and positioning data transmitting means for transmitting local and other positioning data, obtained by said positioning data obtaining means and said positioning data receiving means, in periods of associated time slots via said communications line.

27. The control target surveillance system according to claim 26, wherein said control targets each have monitor means for monitoring whether local and positioning data and relayed positioning data are inserted in a time slot sent at a time of reception of said positioning data.

28. The control target surveillance system according to claim 26, wherein each of said control targets sequentially repeats reception of positioning data, transmission of positioning data and no transmission/reception every surveillance cycle.

29. The control target surveillance system according to claim 26, wherein said positioning data obtaining means inserting obtained time information in positioning data.

30. The control target surveillance system according to claim 26, wherein said positioning data transmitting means has a function of updating positioning data to be sent so as to have latest time information.

31. The control target surveillance system according to claim 23, wherein said control equipment comprises:

time slot managing means for managing said time slots based on said time adjusted by said time adjusting means;

positioning data receiving means for receiving positioning data sent for each time slot from said control target via said communications line every given surveillance cycles;

sender discriminating means for, upon reception of positioning data, discriminating an associated identification code from said time slot to grasp said control target having sent said received positioning data; and display means for displaying a position of each control target based on said positioning data obtained every given surveillance cycles and said control target having sent said positioning data.

32. The control target surveillance system according to claim 31, wherein said control equipment has current position predicting means for, when acquired time information is included in said positioning data, said control equipment, predicting a current position of said control target having sent said positioning data by referring to a flight plan of said control target, and said display means display said predicted current position.

* * * * *